United States Patent
Iwaguchi et al.

(10) Patent No.: US 6,189,794 B1
(45) Date of Patent: *Feb. 20, 2001

(54) BAR CODE READER DETERMINING UNIT FOR DETERMINING THE TRUE CHANGING POINT AND CORRECTING UNIT FOR CORRECTING THE FALSE CHANGING POINT TO CORRECT CHANGING POINT

(75) Inventors: Isao Iwaguchi; Shinichi Satoh; Hiroaki Kawai; Mitsuo Watanabe; Motohiko Itoh, all of Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/053,645

(22) Filed: Apr. 2, 1998

(30) Foreign Application Priority Data

Sep. 22, 1997 (JP) ..................................................... 9-257302

(51) Int. Cl.[7] ........................................................ G06K 7/10
(52) U.S. Cl. .................................. 235/462.27; 235/462.25
(58) Field of Search ......................... 235/462.01, 462.16, 235/462.18, 462.19, 462.25, 462.27, 462.28, 462.29

(56) References Cited

U.S. PATENT DOCUMENTS

| | | | |
|---|---|---|---|
| 3,751,636 | * | 8/1973 | Coles, Jr. ........................ 235/462.27 |
| 4,000,397 | * | 12/1976 | Hebert et al. .................... 235/462.27 |
| 4,356,389 | * | 10/1982 | Quirey et al. ........................ 235/455 |
| 5,103,080 | * | 4/1992 | Barkan ............................ 235/462.27 |
| 5,272,323 | * | 12/1993 | Martino ........................... 235/462.27 |
| 5,294,783 | * | 3/1994 | Hammond, Jr. et al. ........ 235/462.27 |
| 5,302,814 | * | 4/1994 | Kawabata ........................ 235/462.27 |
| 5,463,211 | * | 10/1995 | Arends et al. .................. 235/462.27 |
| 5,608,201 | * | 3/1997 | Coleman, Jr. .................... 235/462.08 |
| 5,811,782 | * | 9/1998 | Sato et al. ........................ 235/462.01 |

* cited by examiner

Primary Examiner—Michael G Lee
Assistant Examiner—Diane I. Lee
(74) Attorney, Agent, or Firm—Armstrong, Westerman, Hattori, McLeland & Naughton

(57) ABSTRACT

A bar-code reader having a photoelectric conversion unit for converting reflected light from a bar code into an electric signal and a changing point detecting unit for detecting, from the electric signal generated by the photoelectric conversion unit, a changing point at which a white stripe is changed to a black stripe in the bar code wherein the bar code is read based on a plurality of changing points detected by the changing point detecting unit. The bar-code reader includes a determination unit for determining, based on measurement of a distance between changing points, whether a changing point is detected as a true changing point at which a white stripe or a black stripe is changed to a black stripe or a white stripe in a bar code or as a false changing point; and a correcting unit for correcting the changing point detected as the false changing point to the true detecting point based on the changing point determined as the true changing point.

11 Claims, 27 Drawing Sheets

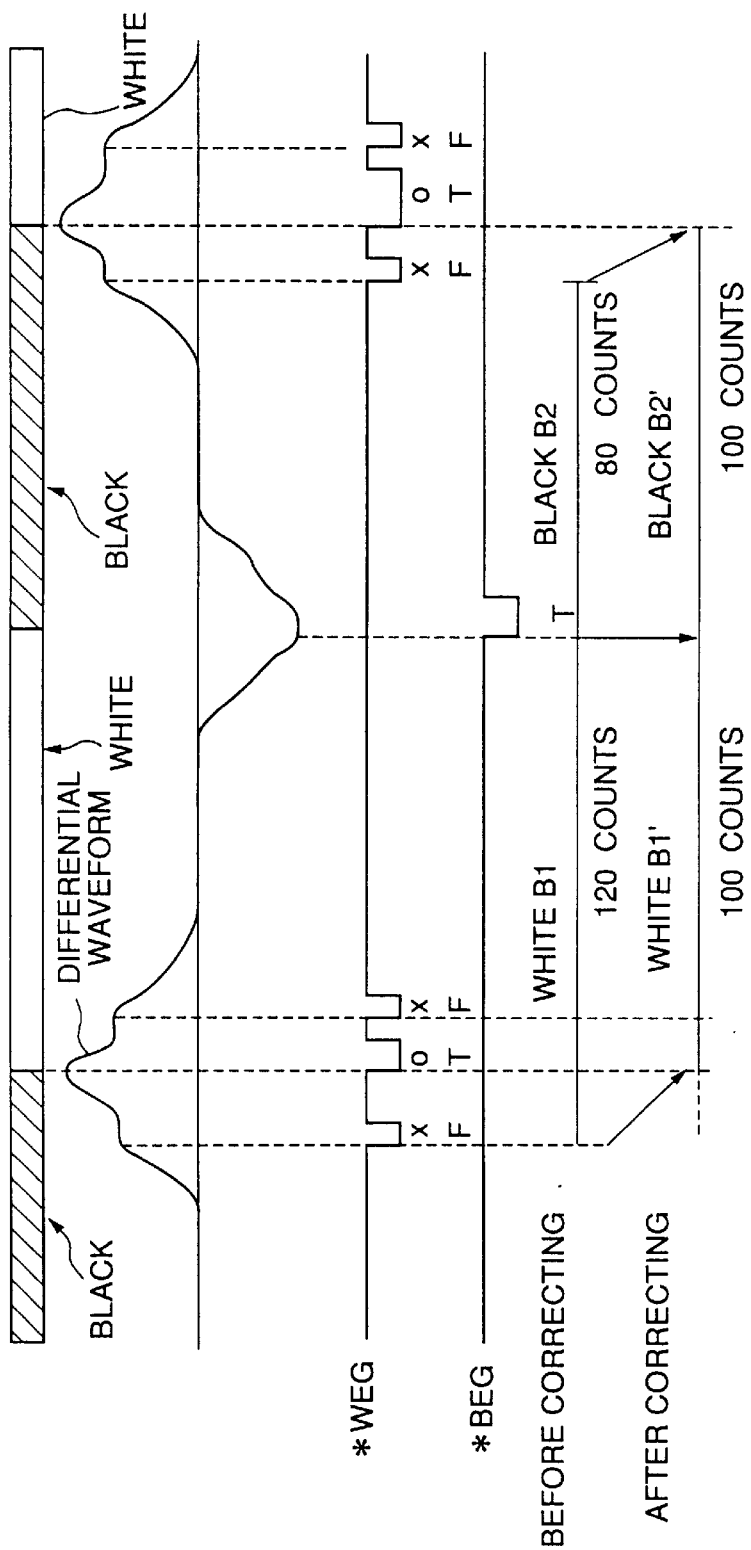

ial waveform signals. The peak detecting circuit 204
BAR CODE READER DETERMINING UNIT FOR DETERMINING THE TRUE CHANGING POINT AND CORRECTING UNIT FOR CORRECTING THE FALSE CHANGING POINT TO CORRECT CHANGING POINT

BACKGROUND OF THE INVENTION (1). Field of the Invention

The present invention generally relates to a bar-code reader, and more particularly to a bar-code reader in which the light beam is shaped by using an aperture so that a beam spot is an circle.

In a laser unit used as a light source of a bar-code reader, the laser beam spot is generally elliptically shaped. The laser beam is shaped by using an aperture so that a beam spot of the laser beam is a circle. In this case, the laser beam is diffracted by the aperture (the Fresnel diffraction). The influence of the Fresnel diffraction strongly appears on a part of the laser beam which is located at the upstream side of the beam west of the laser beam.

In recent years, bar-code readers are required to be operated at a high speed and have high performance. A bar-code reader in which scanning beams are output in various directions so that bar codes on articles can be read in various directions has been popularized. To accurately read a bar code, it is necessary to adjust an optical path length of a scanning beam so that a beam west of the scanning beam is located in a reading area in which a bar code should be read.

However, in a case where the scanning beams are output in various directions, it is difficult to adjust the beam west of every scanning beam is located in the reading area in which the bar code should be read. Thus, the parts of some of the scanning beams in which the influence of the Fresnel diffraction strongly appears may be located in the reading area.

(2). Description of the Related Art

FIG. 1 shows a conventional bar-code reader using a differential operation.

Referring to FIG. 1, the conventional bar-code reader has a photoelectric conversion unit 201, an amplifier (AMP) 202, a differentiating circuit 203, a peak detecting circuit 204, a gate generating unit 205, a black-edge generating unit 206, a white-edge generating unit 207, and a B-W width counter 208. The photoelectric conversion unit 201 converts reflected light from a bar code into electric signals. The AMP 202 amplifies infinitesimal signals into signals which can be processed. The differentiating circuit 203 differentiates the signals generated by the AMP 202 so as to generate differential waveform signals. The peak detecting circuit 204 detects minus and plus peak points of the differential waveform signals. The gate generating unit 205 generates enable signals to cause the peak detecting circuit 204 to detect the peak points. The black-edge generating unit 206 generates edge signals corresponding to the minus peak points detected by the peak detecting circuit 204. The white-edge generating unit 207 generates edge signals corresponding to the pulse peak points detected by the peak detecting unit 204. The B-W width counter 208 counts a distance between change points corresponding to the respective edge signals.

The bar-code reader using the differential operation detects peak points of the differential waveform of an electric signal, so that change points between white and black areas of a bar code can be detected. For example, in the bar-code reader as shown in FIG. 1, a bar code as shown in FIG. 4A is scanned by a scanning beam having an intensity distribution as shown in FIG. 4D. In this case, the reflected light from the bar code is converted into an electric signal by the photoelectric conversion unit 201 and the AMP 202 amplifies the electric signal so as to generate an electric signal, as shown in FIG. 4B, which can be processed by a circuit will be described later.

The differentiating circuit 203 differentiates the electric signal generated by the AMP 202 so as to generate the differential waveform signal as shown in FIG. 4C. The peak detecting unit 204 detects peak points of the differential waveform signal generated by the differentiating circuit 203 so as to obtain change points between black and white areas of the bar code. The peak detecting unit carries out a process for detecting peak points while a gate signal generated by the gate generating unit 205 is in an enable state (e.g., "1"). The gate generating unit 205 checks the differential waveform signal generated by the differentiating circuit 203. When the level of the differential waveform signal exceeds a specific voltage value, the gate generating unit 205 supplies an output of "1" to the peak detecting circuit 204. The specific voltage value is set at a value by which the change points can be detected.

In addition, the differential waveform signal generated by the differentiating circuit 203, as shown in FIG. 4C, has plus peak points corresponding to change points at each of which the bar code is changed from the black area to the white area and minus points corresponding to change points at each of which the bar code is changed from the white area to the black area.

When the peak detecting unit 204 detects a peak point of the differential waveform signal, the black-edge generating unit 206 and the white-edge generating unit 207 respectively generate edge signals in synchronism with the minus peak point and the plus peak point. The B-W width counter 208 counts a period of time between times at which the edge signals are generated.

In the conventional bar-code reader, in order to read the bar code, the B-W width counter 208 counts a period of time between times at which the edge signals are generated, that is, the difference between the change points is measured.

However, in the conventional bar-code reader, a part of a scanning beam affected by the Fresnel diffraction so as to have an intensity distribution as shown in FIG. 5D may scan a bar code in the reading area. In this case, the intensity distribution of the scanning beam greatly affects the electric signal into which the reflected light from the bar code is converted. In the differentiating operation in which the electric signal generated after the photoelectric conversion of the reflected light is differentiated, the intensity distribution of the scanning beam corresponds to the differential waveform.

That is, when the part of the scanning beam affected by the Fresnel diffraction as shown in FIG. 5D scans the bar code as show in FIG. 5A, the signal as shown in FIG. 5B is generated by the photoelectric conversion unit 201. Thus, the differential waveform has a plurality of peaks corresponding to edges of stripes of the bar code, so that a plurality of change points for each edge of a stripe are detected.

Thus, due to the influence of the Fresnel diffraction, the true change point and false change points are detected. If the distance between the false change points is measured, the bar code is erroneously read.

SUMMARY OF THE INVENTION

Accordingly, a general object of the present invention is to provide a novel and useful bar-code reader in which the disadvantages of the aforementioned prior art are eliminated.

A specific object of the present invention is to provide a bar-code reader in which the true change points corresponding to edges of stripes of a bar code can be detected by use of the scanning beam scanning a bar code in a reading area affected by the Fresnel diffraction can be detected.

The above objects of the present invention are achieved by a bar-code reader having photoelectric conversion means for converting reflected light from a bar code into an electric signal and changing point detecting means for detecting, from the electric signal generated by the photoelectric conversion means, a changing point at which a white stripe is changed to a black stripe in the bar code or a black stripe is changed to a white stripe in the bar code wherein the bar code is read based on a plurality of changing points detected by the changing point detecting means, the bar-code reader comprising: determination means for determining, based on measurement of a distance between changing points, whether a changing point is detected as a true changing point at which a white stripe or a black stripe is changed to a black stripe or a white stripe in the bar code or as a false changing point; and correcting means for correcting the changing point detected as the false changing point to the true detecting point based on the changing point determined as the true changing point.

According to the present invention, in a case where a part of the light beam affected by the Fresnel diffraction as shown in FIG. 5D scans the bar code as shown in FIG. 5A, the photoelectric conversion means outputs the electric signal as shown in FIG. 5B. The determination means uses, for example, a differential waveform signal obtained by differentiating the electric signal and determines whether a changing point is detected as the true changing point or as the false changing point. The correcting means corrects the false changing point to the true changing point.

Thus, even if a part of light beam affected by the Fresnel diffraction scans the bar code, the true changing points can be detected, so that the bar code can be accurately read.

The above objects of the present invention are also achieved by a bar-code reader having photoelectric conversion means for converting reflected light from a bar code into an electric signal, wherein changing points at which a white or black striped is changed to a black or white stripe in the bar code are detected from the electric signal generated by the photoelectric conversion means so that the bar code is read, the bar-code reader comprising: comparing means for comparing the electric signal generated by the photoelectric conversion means and a predetermined fixed voltage; and hysteresis means for processing the electric signal with a hysteresis characteristic so that influence of Fresnel diffraction on light scanning the bar code is eliminated when the electric signal is greater than the predetermined fixed voltage.

According to the present invention, in a case where a part of light beam affected by the Fresnel diffraction scans as shown in FIG. 5D scans the bar code as shown in FIG. 5A, the photoelectric conversion means outputs the electric signal as shown in FIG. 5B. For example, a differential waveform signal generated by differentiating the electric signal is used and a plurality of changing points corresponding to peak points of the differential waveform signal are generated. In this case, the false changing points are absorbed in the process with the hysteresis characteristic.

Thus, even if a part of light beam affected by the Fresnel diffraction scans the bar code, the true changing points can be detected, so that the bar code can be accurately read.

Further, the above objects of the present invention are achieved by a bar-code reader having photoelectric conversion means for converting reflected light from a bar code into an electric signal wherein changing points at which a white or black stripe is changed to a black or white stripe in the bar code are detected so that the bar code is read, the bar-code read comprising: gate signal generating means for generating a gate signal indicating that a white or black stripe is changed to a black or white stripe in the bar code; maximum detecting means for detecting for detecting a changing point having a maximum value out of a plurality of detected changing points when the gate signal generated by the gate signal generating means indicates that a white or black striped is changed to a black or white stripe; and mask signal generating means generating a mask signal which masks changing points generated before the maximum detecting means detects the changing point having the maximum value, wherein a changing point detected first after the mask signal generated by the mask signal generating means is removed is decided as the true changing point.

According to the present invention, in a case where a part of light beam affected by the Fresnel diffraction scans as shown in FIG. 5D scans the bar code as shown in FIG. 5A, the photoelectric conversion means outputs the electric signal as shown in FIG. 5B. For example, a differential waveform signal generated by differentiating the electric signal is used and a plurality of changing points corresponding to peak points of the differential waveform signal are generated. In this case, changing points generated due to the influence of the Fresnel diffraction before the changing point having the maximum value is detected by the maximum detecting means are masked by the mask signal generated by the mask signal generating means.

Thus, even if a part of light beam affected by the Fresnel diffraction scans the bar code, the true changing points can be detected, so that the bar code can be accurately read.

BRIEF DESCRIPTION OF THE DRAWINGS

Other objects, features and advantages of the present invention will be apparent from the following description when read in conjunction with the accompanying drawings, in which:

FIG. 6 is a diagram illustrating the number of counts before and after correction in a bar-code reader according to an embodiment of the present invention;

DESCRIPTION OF THE PREFERRED EMBODIMENTS

A description will be given of the principle of the bar-code reader according to the present invention.

Figure 1:
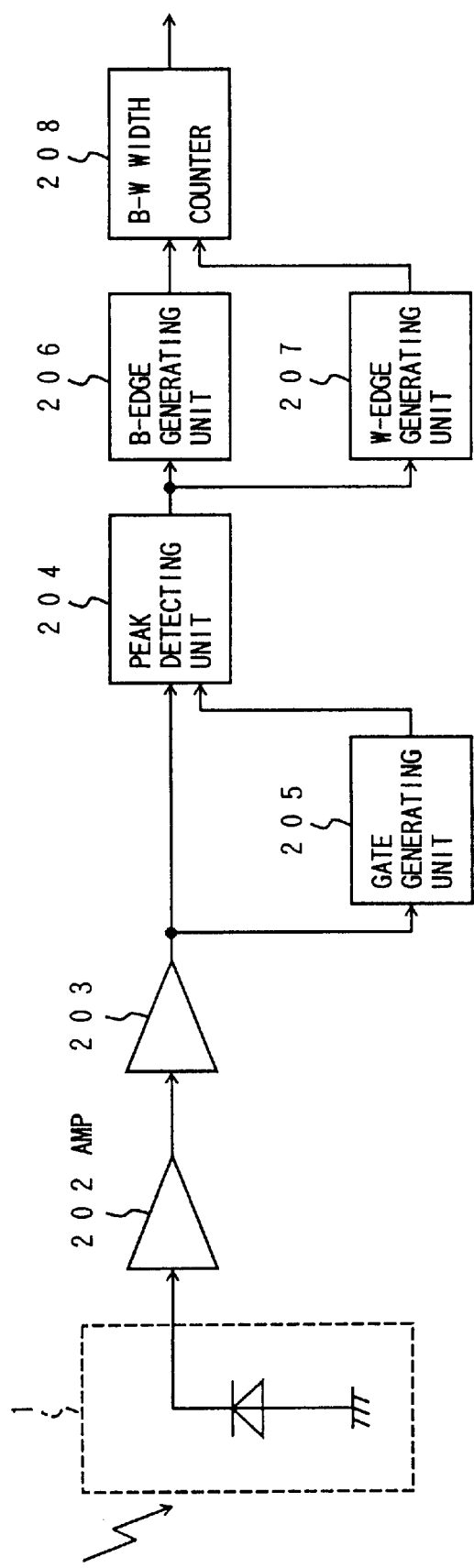
FIG. 1 is a block diagram illustrating a conventional bar-code reader.
Figure 2:
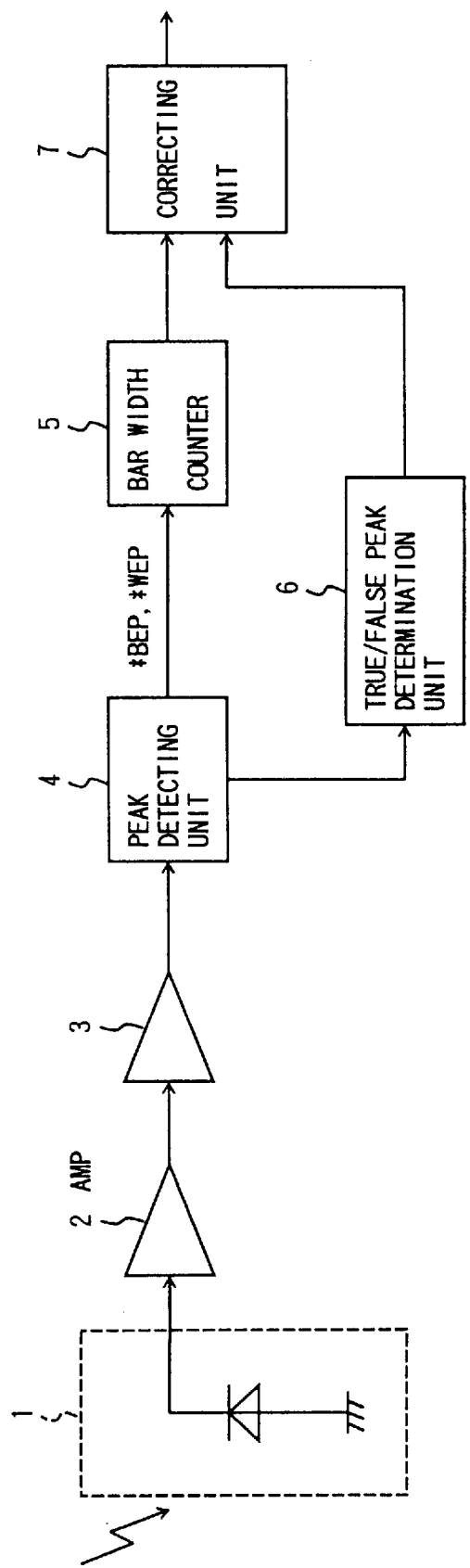
FIG. 2 is a block diagram illustrating the principle of a bar-code reader according to the present invention.

The bar-code reader is formed as shown in FIG. 2.

Referring to FIG. 2, the bar-code reader has a photoelectric conversion circuit 1, a amplifier (AMP) 2, a differentiating circuit 3, a peak detecting circuit 4, a bar width counter 5, a true/false peak determination unit 6 and a correcting unit 7. The photoelectric conversion circuit 1 converts reflected light from a bar code into electric signals. The AMP 2 amplifies infinitesimal signals into signals which can be processed. The differentiating circuit 3 differentiates the signals from the AMP 2 and generates differential waveform signal. The peak detecting circuit 4 detects minus and plus peak points of the differential waveform signals. The bar width counter 5 counts a distance between change points corresponding to the respective peak points. The true/false peak determination unit 6 determines whether each of the changing points detected by the peak detecting circuit 4 is true or false. In a case where the true/false peak determination unit 6 determines that a changing point is false, the correcting unit 7 corrects the change point to a true changing point.

Figure 3A:
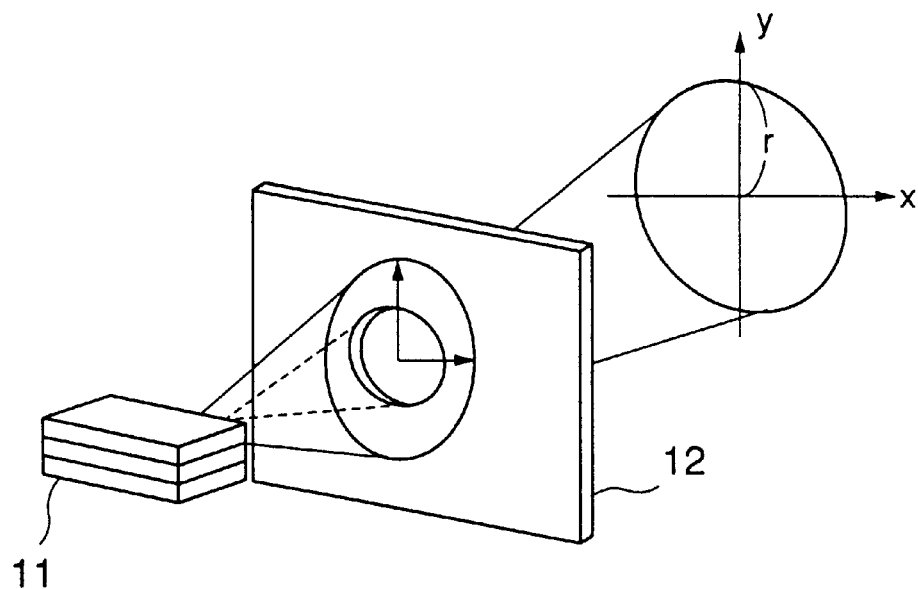
FIG. 3A is a diagram illustrating a structure of the bar-code reader according to an embodiment of the present invention.
Figure 3B:
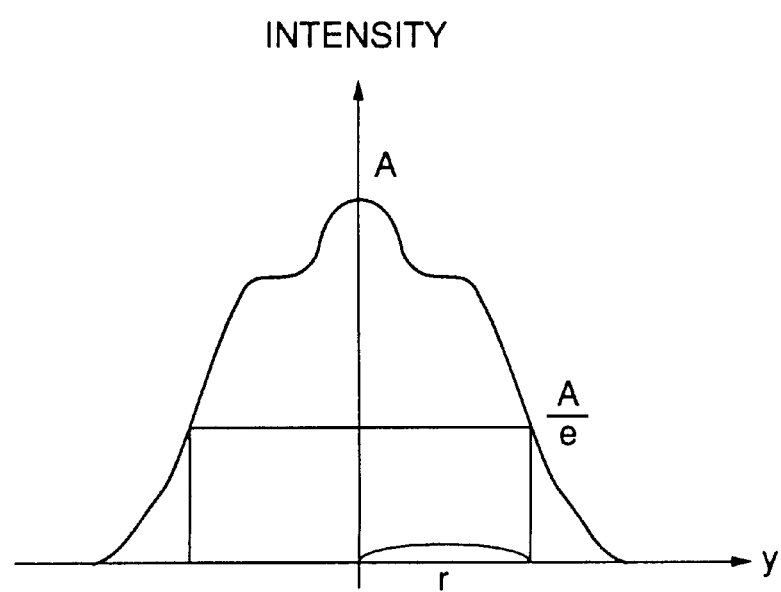
FIG. 3B is a diagram illustrating the intensity distribution of the light with respect to the distance from the center of the beam.

In the bar-code reader, a laser diode emits a scanning beam having an elliptic beam spot as shown in FIG. 3A. The scanning beam is shaped using an aperture of the aperture plate 12 so that the beam spot is a circle. The laser beam is diffracted by the aperture (the Fresnel diffraction), and the diffracted light components are interfered with each other. The intensity distribution of the light with respect to the distance from the center of the beam is formed as shown in FIG. 3B.

Figure 4A:
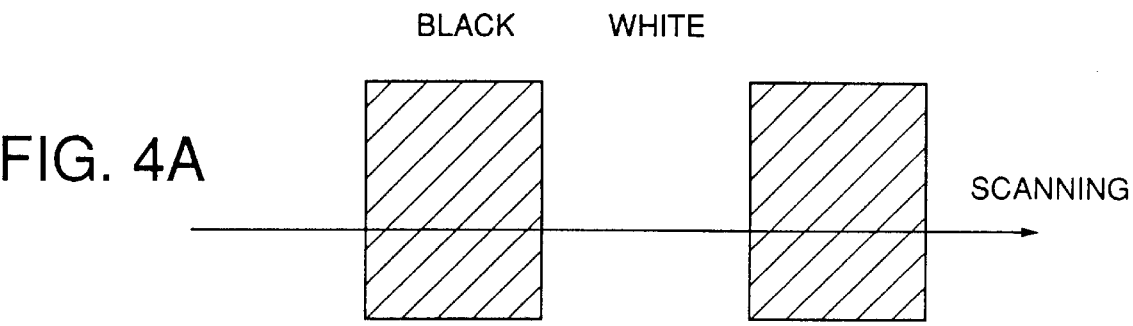
FIG. 4A is a diagram illustrating stripes of a bar code.
Figure 4B:
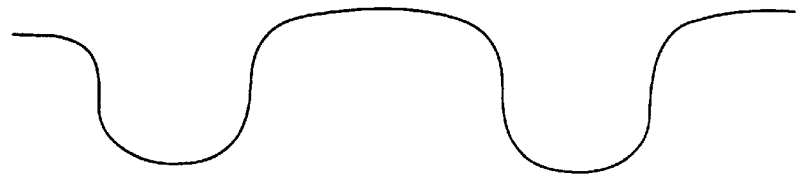
FIG. 4B is a waveform diagram illustrating an electric signal obtained when the bar code having the strips shown in FIG. 4A is scanned by a scanning beam.

The bar-code reader according to the present invention detects peak points of the differential waveform signal and further detects changing points between black stripes and white stripes of a bar code based on the detected peak points, using the differential operation in the same manner as in the conventional case. In the bar-code reader as shown in FIG. 2, when the scanning beam having the light intensity distribution as shown in FIG. 4D scans a bar code as shown in FIG. 4A, the reflected light from the bar code is converted into an electric signal by the photoelectric conversion circuit 1. The electric signal is further amplified by the AMP 2 so that an electric signal, as shown in FIG. 4B, which can be processed in a following circuit is obtained.

Figure 4C:
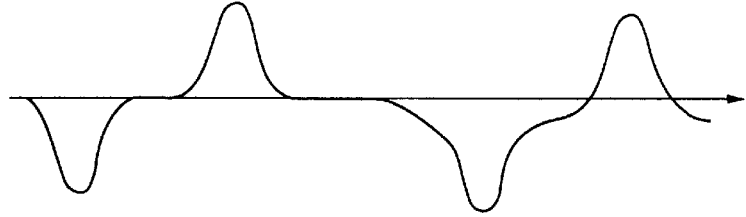
FIG. 4C is a waveform diagram illustrating a differential waveform signal obtained by differentiating of the electric signal shown in FIG. 4B.
Figure 4D:
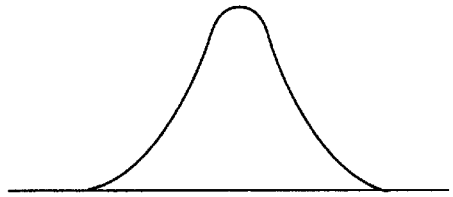
FIG. 4D is a diagram illustrating an intensity distribution of a scanning beam which scans the bar code as shown in FIG. 4A.

The differentiating circuit 3 differentiates the electric signal output from the AMP 2 and generates a differential waveform signal as shown in FIG. 4C. The peak detecting unit 4 detects peak points of the differential waveform signal so as to obtain changing points between white stripes and black stripes of the bar code. In the differential waveform signal generated by the differentiating circuit 3 as shown in FIG. 4C, each plus peak point corresponds to a changing point at which a scanning position is moved from a black stripe to a white stripe and each minus peak point corresponds to a changing point at which the scanning position is moved from a white stripe to a black stripe.

After the peak points are detected by the peak detecting unit 4, the bar width counter 5 measures the respective widths of each black stripe and white stripe of the bar code. That is, the bar width counter 5 counts a distance between respective changing points corresponding to the peak points.

In the bar code reader according to the present invention, the bar width counter 5 counts the distance between the changing points so that a bar (a stripe) width is detected. The detected bar widths of the bar code are decoded, so that the bar code is read.

Figure 5A:
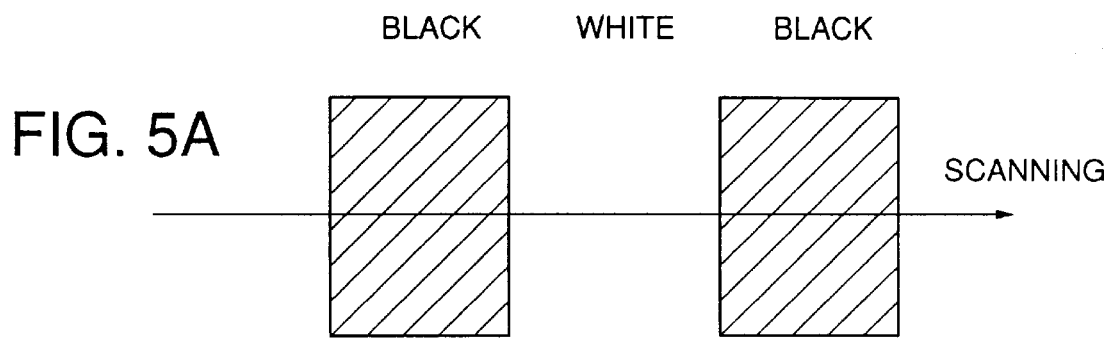
FIG. 5A is a diagram illustrating a structure of a bar code.
Figure 5B:
FIG. 5B is a waveform diagram illustrating an electric signal obtained when a part of a scanning beam affected by the Fresnel diffraction scans the bar code having the stripes shown in FIG. 5A.
Figure 5C:
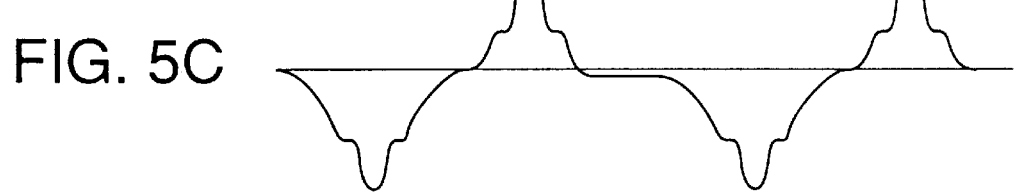
FIG. 5C is a waveform diagram illustrating a differential waveform signal obtained by differentiating of the electric signal shown in FIG. 5B.
Figure 5D:
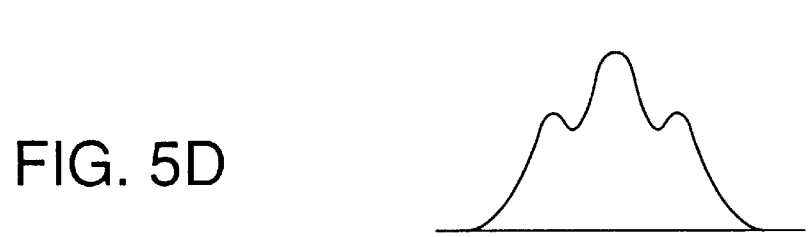
FIG. 5D is a diagram illustrating an intensity distribution of a part of a scanning beam affected by the Fresnel diffraction.

In a case where the part of the scanning beam affected by the Fresnel diffraction so that the light intensity distribution is formed as shown in FIG. 5D scans a bar code shown in FIG. 5B, an electric signal as shown in FIG. 5B is generated by the photoelectric conversion circuit 1 and AMP 2. The differential waveform signal generated by the differentiating circuit 3 has a plurality of peak points at an edge of each black stripe of the bar code. Thus, a plurality of changing points are obtained at an edge of each black stripe of the bar code. When the part of the beam affected by the Fresnel diffraction scans the bar code, the light intensity distribution of the beam strongly affects the waveform of the electric signal to which the reflected light from the bar code is converted. In a case where the differential operation in which the electric signal converted from the reflected light is differentiated is carried out, the light intensity distribution of the beam corresponds to the waveform of the differential waveform signal.

In this case, in the bar-code reader, the true/false peak determination unit 6 determines, according to a predetermined method, whether each detected changing point is a false changing point based on the Fresnel diffraction or a true changing point. The correcting unit 7 corrects the false changing point and the bar code is read. Specifically, when the scanning position is moved from a black stripe to a white stripe on the bar code, due to the Fresnel diffraction of the scanning beam, a plurality of changing points are detected as shown in FIG. 6 (see *WEG in FIG. 6). On the other hand, when the scanning position is moved from a white stripe to a black stripe, only a single changing point (a true *BEG In FIG. 6).

In FIG. 6, in a case where a plurality of changing points detected when the scanning position is moved from the black stripe to the white stripe on the bar code are not corrected (before correction), the bar width counter 5 counts, as the width of the white stripe (the white bar), the distance between the first changing point from the black stripe to the white stripe and the single changing point from the white stripe to the black stripe. The count value is, for example, one hundred and twenty (120). In addition, the bar width counter 5 counts, as the width of the black stripe (the black bar), the distance between the single changing point from the white stripe to the black stripe and the first changing point from the black stripe to the white stripe. The count value is, for example, eighty (80). Thus, the width of the white stripe which is measured by the bar width counter 5 is greater than the width of the actual white stripe. In addition, the width of the black stripe which is measured by the bar width counter 5 is less than the width of the actual black stripe.

On the other hand, in a case where the true/false peak determination unit 6 determines whether a changing point is the true changing point or a false changing point caused by the Fresnel diffraction and the correcting unit 7 corrects the false changing point (after correction in FIG. 6), the bar width counter 5 counts the width of the white stripe as 100 counts and the width of the black stripe as 100 counts. Thus, the bar-code reader according to the present invention corrects detected changing points corresponding to edges of strips of the bar code and prevents the bar code from being erroneously read.

A description will now be given of embodiments of the present invention.

Figure 7:
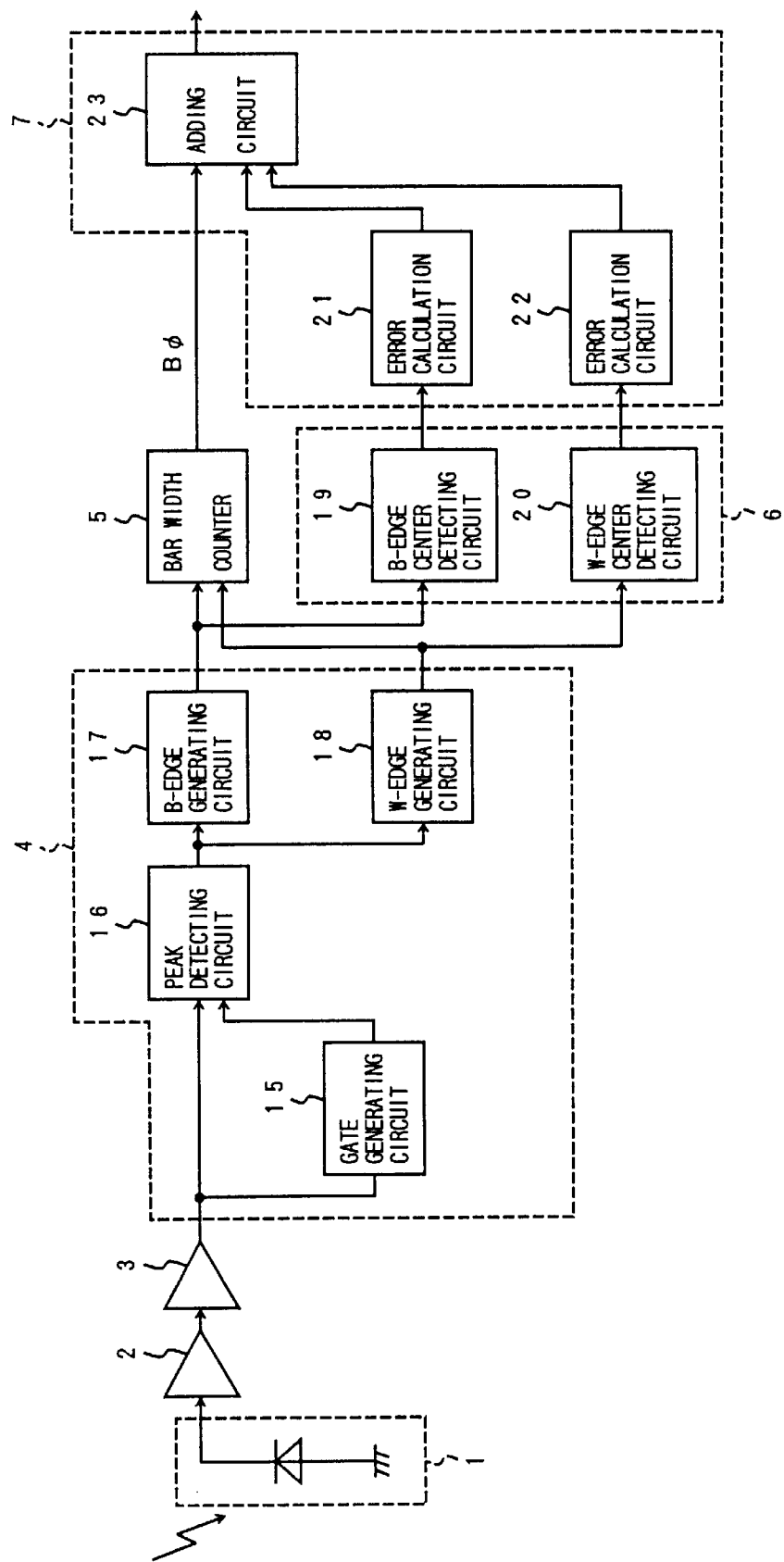
FIG. 7 is a block diagram illustrating the bar-code reader according to a first embodiment of the present invention.

The bar-code reader according to a first embodiment of the present invention is formed as shown in FIG. 7. In FIG. 7, those parts which are the same as those shown in FIG. 2 are given of the same reference numbers.

Referring to FIG. 7, the bar-code reader has the photoelectric conversion circuit 1, the AMP 2, the differentiating circuit 3, the peak detecting unit 4, the bar width counter 5, the true/false peak determination unit 6 and the correcting unit 7 in the same manner as that shown in FIG. 2.

The peak detecting unit 4 has a gate generating circuit 15, a peak detecting circuit 16, a B-edge generating circuit 17 and a W-edge generating circuit 18. The peak detecting circuit 16 detects plus and minus peak points of the differential waveform signal, each of the peak points corresponding to a changing point of a bar code. The gate generating circuit 15 generates an enable signal used by the peak point detecting circuit to detect the peak points. The B-edge generating circuit 17 generates an edge signal "BEG" corresponding to a minus peak point detected by the peak detecting circuit 16. The W-edge generating circuit 18 generates an edge signal "WEG" corresponding to a plus peak point detected by the peak detecting circuit 16. That is, the peak detecting unit 4 has a function for detecting plus and minus peak points of the differential waveform signal. When the enable signal generated by the gate generating circuit 15 is in the state of "1", the peak detecting circuit 16 carries out a process for detecting peak points. The gate generating circuit 14 monitors the differential waveform signal generated by the differentiating circuit 3. When the level of the differential waveform signal exceeds a specific voltage level, the output (the enable signal) is controlled in a state of "1" and the output is supplied to the peak detecting circuit 16. The specific voltage level is set so that changing points can be detected in the differential waveform signal. The differential waveform signal generated by the differentiating circuit 3 has plus peaks each of which corresponds to a changing point from a black stripe to a white stripe on a bar code and minus peaks each of which corresponds to a changing point from a white stripe to a black stripe on a bar code, as shown in FIG. 4C.

The true/false peak determination unit 6 has a B-edge center detecting circuit 19 and a W-edge center detecting circuit 20. In a case where a plurality of minus changing points are generated due to the influence of the Fresnel diffraction, the B-edge center detecting circuit 19 detects, as the true changing point, a changing point closest to the center of a gate signal "GATE" generated by the gate generating circuit 15. In a case where a plurality of plus changing points are generated due to the influence of the Fresnel diffraction, the W-edge center detecting circuit 20 detects, as the true changing point, a changing point closes to the center of the gate signal "GATE" generated by the gate generating circuit 15. The true/false peak determination unit 6 has a function for determining whether each of changing points corresponding to peak points detected by the peak detecting unit 4 is truth of falsehood.

The correcting unit 7 has an error calculation circuits 21 and 22 and an adding circuit 23. The error calculation circuit 21 calculates a difference between the true changing point detected by the B-edge center detecting circuit 19 and a false changing point. The error calculation circuit 22 calculates a difference between the true changing point detected by the W-edge center detecting circuit 20 and a false changing point. The adding circuit 23 adds the differences calculated by the error calculation circuits 21 and 22 to each other. The correcting unit 7 has a function for correcting the count value based on the differences in order to change a changing point determined as a false changing point by the true/false peak determination unit 6 to the true changing point.

In the bar-code reader formed as shown in FIG. 7, a changing point closest to the center of the gate signal generated by the gate generating circuit is decided as the true changing point.

A detailed description will now be given, with reference to FIGS. 8 and 9, of the determining process in the W-edge center detecting circuit 20 of the true/false determination circuit 6 and a correcting process in the correcting circuit based on the result obtained by the W-edge center detecting circuit 20. Since the determining process in the B-edge center detecting circuit 19 is the same as that in the W-edge center detecting circuit 20, the determining process in the B-edge center detecting circuit is omitted.

Figure 9:
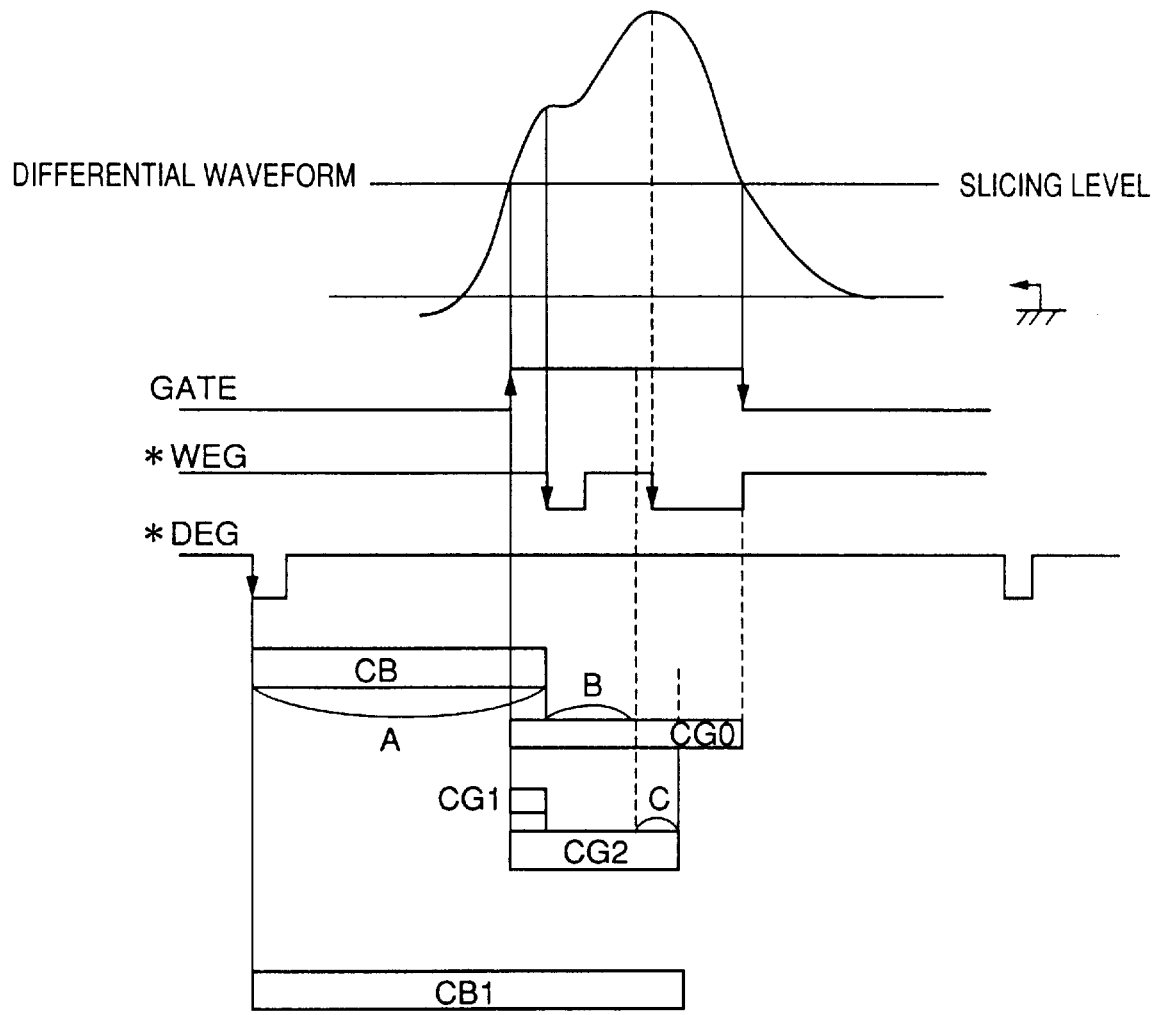
FIG. 9 is a waveform diagram illustrating an operation of the bar-code reader according to the first embodiment of the present invention.

For example, in a case where the light beam affected by the Fresnel diffraction scans the bar code from a black strip to a white stripe as shown in FIG. 9, the gate generating circuit 15 monitors the differential waveform signal generated by the differentiating circuit 3. When the level of the differential waveform signal exceeds a specific voltage level, namely, a slicing level show in FIG. 9, the gate generating circuit 15 outputs the gate signal "GATE" having the value of "1" so as to inform the peak detecting circuit 16 that the gate signal is in the enable state. The peak detecting circuit 16 receiving the gate signal "GATE" having the value of "1" detects peak points of the differential waveform signal. The W-edge generating circuit 18 and the B-edge generating circuit 17 respectively edge signals "WEG" and "BEG" corresponding to the peak points detected by the peak detecting circuit 16.

Figure 8:
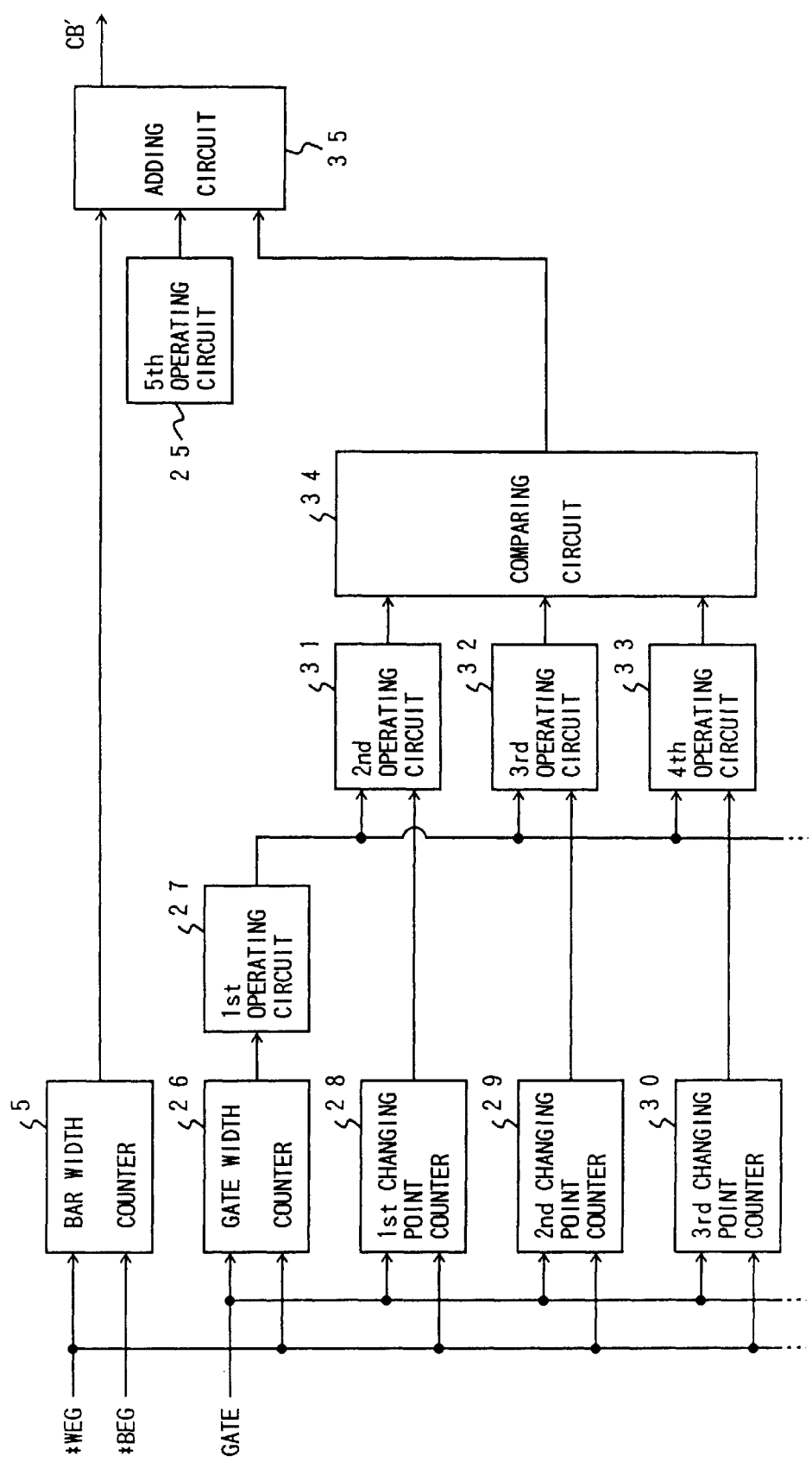
FIG. 8 is a block diagram illustrating an example of a circuit corresponding to a true/false peak determination unit and a correcting unit of the bar-code reader according to the first embodiment of the present invention.

Thus, the peak detecting circuit 4 shown in FIG. 7 outputs the gate signal "GATE", the edge signal "WEG" corresponding to the plus changing point and the edge signal "BEG" corresponding to the minus changing point to the true/false peak determination circuit 6 and the correcting circuit 7 which are formed as shown in FIG. 8. In the true/false peak determination circuit 6 and the correcting circuit 7 having the structure shown in FIG. 8, it is determined, based on the received signals, whether a changing point is the true changing point or the false changing point generated due to the influence of the Fresnel diffraction. A changing point determined as the false changing point is then corrected to the true changing point.

Referring to FIG. 8, a unit of the true/false peak determination circuit 6 and the correcting circuit 7 includes a gate width counter 26, a first changing point counter 28, a second changing point counter 29, third changing point counter 30, a first operating circuit 27, a second operating circuit 31, a third operating circuit 32, a fourth operating circuit 33, a comparing circuit 34, a fifth operating circuit 25 and a adding circuit 35. The gate width counter 26 counts the width of the gate signal "GATE". The count value of the gate width counter 26 is represented by "CG0". The first changing point counter 28 counts the width between the rising edge of the gate signal "GATE" and the falling edge of the edge signal "WEG" for the first peak. The count value of the first changing point counter 28 is represented by "CG1". The second changing point counter 29 counts the width between the rising edge of the gate signal "GATE" and the falling edge of the edge signal "WEG" for the second peak. The count valued of the second changing point counter 29 is represented by "CG2". The third changing point counter 30 counts the width between the rising edge of the gate signal "GATE" and the falling edge of the edge signal "WEG" for the third peak. The count value of the third changing point counter 30 is represented by "CG3". The first operating circuit 27 calculates the half of the count value "CG0". The calculation result obtained by the first operating circuit 27 is represented by "CG0/2". The second operating circuit 31 calculates the difference between the outputs of the first operating circuit 27 and the first changing point counter 28. The third operating circuit 32 calculates the difference between the outputs of the first operating circuit 27 and the second changing point counter 29. The fourth operating circuit 33 calculates the difference between the outputs of the first operating circuit 27 and the third changing point counter 30. The comparing circuit 34 compares results obtained by the second operating circuit 31, the third operating circuit 32 and the fourth operating circuit 33 and outputs the minimum vale of the compared results. The fifth operating circuit 25 calculates the difference between the false count value which has been previously detected and the calculation result "CG0/2". The adding circuit 35 corrects a false changing point which has been previously detected to the true changing point.

Referring to FIG. 9, the bar width counter 5 counts the width between the falling edge of the edge signal "BEG" corresponding to the true changing point from a white stripe to a black tripe and the falling edge of the edge signal "WEG" corresponding to a false changing point detected at the first peak point. The bar width counter 5 output the count value "CB". This count value "CB" is shown by A in FIG. 9.

When the gate signal "GATE" has the value of "1", the gate width counter 26, the first changing point counter 28 and the second changing point counter 29 respectively carry out the count operations for the "CG0", "CG1" and "CG2". Further, the first operation circuit 27 calculates the value "CG0/2" using the count value "CG0" obtained by the gate width counter 26. The fifth operating circuit 25 calculates the difference between the false changing point which has been previously detected and the vale "CG0/2". The calculating result obtained by the fifth operating circuit 25 is indicated by B in FIG. 9.

The second operating circuit 31 then calculates (CG1-CG0/2) and the third operating circuit 32 calculates (CG2-CG0/2). The comparing circuit 32 outputs smaller one of the values (CG1-CG0/2) and (CG2-CG0/2). The smaller one is indicated by C in FIG. 9.

In the true/false peak determination circuit 6 and the correcting circuit 7, the vales indicated by A, B and C in FIG. 9 are added by the adding circuit 35. The changing signal closest to the center of the gate signal "GATE" is selected as the true changing point, so that the false changing point detected at the first peak point is corrected to the position of the true changing point.

That is, the count value "CB1" corresponding to the true changing point obtained by the correction can be calculated by the following equation.

$$CB1 = CB + |CG0/2 - CG1| + |CG0/2 - CG2|$$

A description will now be given of another example of the bar-code reader in which a changing point closest to the center of the gate signal generated by the gate generating circuit 15 is decided as the true changing point.

In a case where the light beam affected by the Fresnel diffraction scans the bar code from the black stripe to the white stripe, the gate generating circuit 15 monitors the differential waveform signal generated by the differentiating circuit 3. When the level of the differential waveform signal exceeds the specific voltage level, the gate generating circuit 15 outputs the gate signal "GATE" having the value of "1" so as to inform the peak detecting circuit 16 that the gate signal is in the enable state. The peak detecting circuit 16 receiving the gate signal "GATE" having the value of "1" detects peak points of the differential waveform signal. Further, the W-edge generating circuit 18 and the B-edge generating circuit 17 respectively output the edge signal "WEG" and "BEG" corresponding to the peak points detected by the peak detecting circuit 16.

Figure 10:
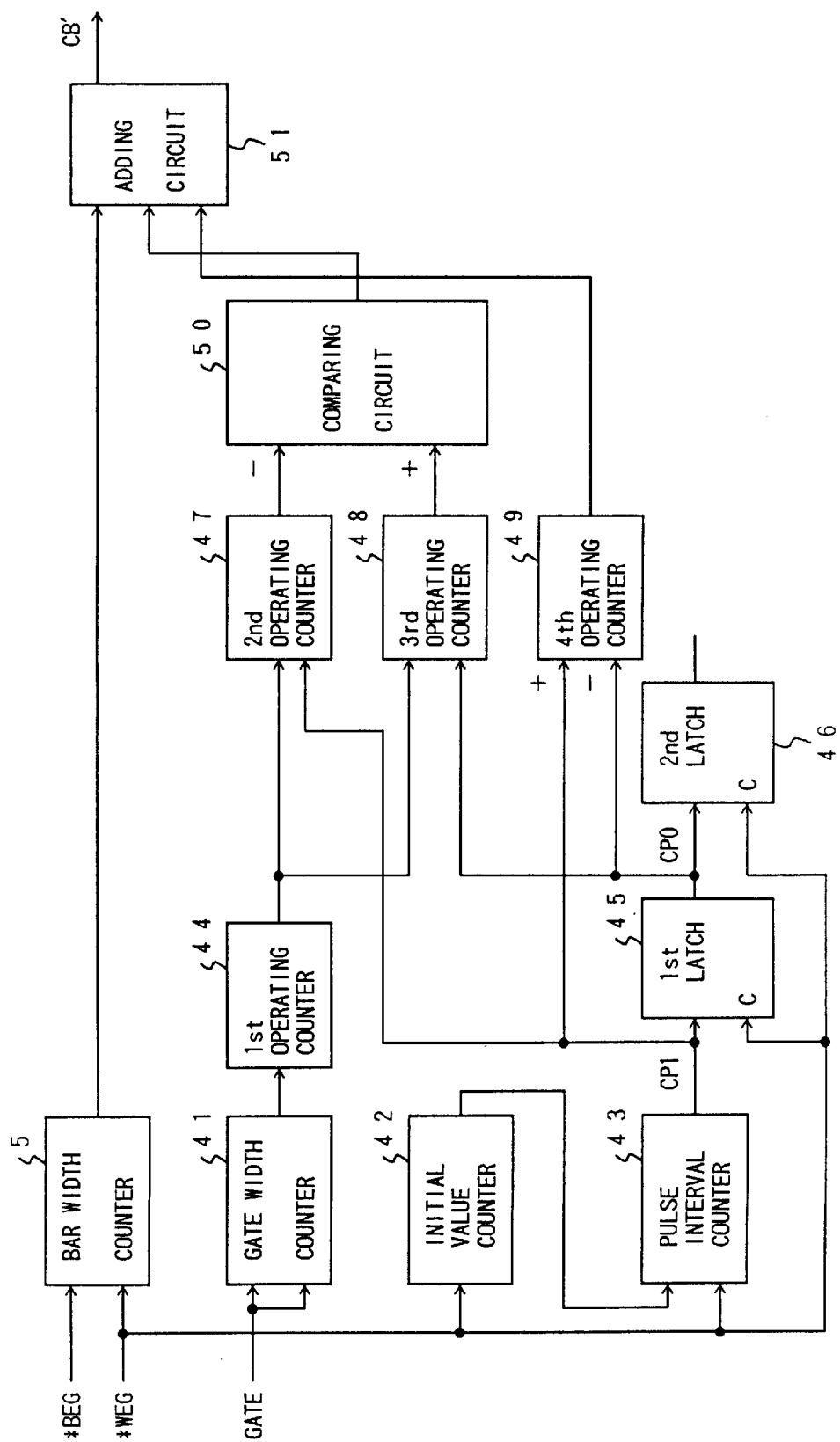
FIG. 10 is a block diagram illustrating another example of the circuit corresponding to the true/false peak determination unit and the correcting unit of the bar-code reader according to the first embodiment of the present invention.

Thus, the peak detecting circuit 16 shown in FIG. 7 outputs the gate signal "GATE", the edge signal "WEG" corresponding to the plus changing point and the edge signal "BEG" corresponding to the minus changing point to a unit of the true/false peak determination circuit 6 and the correcting circuit 7 shown in FIG. 10. The unit of the true/false peak determination circuit 6 and the correcting circuit 7 shown in FIG. 10 determines, based on the received signals, whether a changing signal is the false signal generated due to the influence of the Fresnel diffraction or the true changing point. A false changing point is then corrected to the true changing point.

Referring to FIG. 10, the unit of the true/false peak determination circuit 6 and the correcting circuit 7 has a gate width counter 41, an initial value counter 42, a pulse width counter 43, a first operating circuit 44, a first latch 45, a second latch 46, a second operating circuit 47, a third operating circuit 48, a fourth operating circuit 49, a comparing circuit 50 and an adding circuit 51. The gate width counter 41 counts the width of the gate signal "GATE". The count value of the gate width counter 41 is represented by "CG0". The initial value counter 42 counts the width between the rising edge of the gate signal "GATE" and the falling edge of the edge signal "WEG" for the first peak. The count value of the initial value counter 42 is represented by "CI". The pulse width counter 43 counts the widths between the rising edge of the gate signal "GATE" and the falling edges of the edge signal "WEG" for the first and second peaks. The count values are respectively represented by "CP0" and "CP1". The first operating circuit 44 calculates the half of the "CG0". The result obtained by the first operating circuit 44 is represented by "CG0/2". The first latch 45 and the second latch 46 latch the output of the pulse width counter 43 at every falling edge of the edge signal "WEG". The second operating circuit 47 calculates the difference between the output of the first operating circuit 44 and the "CP1". The third operating circuit 48 calculates the difference between the output of the first operating circuit 44 and the "CP1". The fourth operating circuit 49 calculates the difference between the "CP1" and the "CP0". The comparing circuit 50 compares the calculating results of the second operating circuit 47 and the third operating circuit and output the smallest one of the calculating results. The adding circuit 51 corrects a false changing point which has been previously detected to the true changing point.

Figure 11:
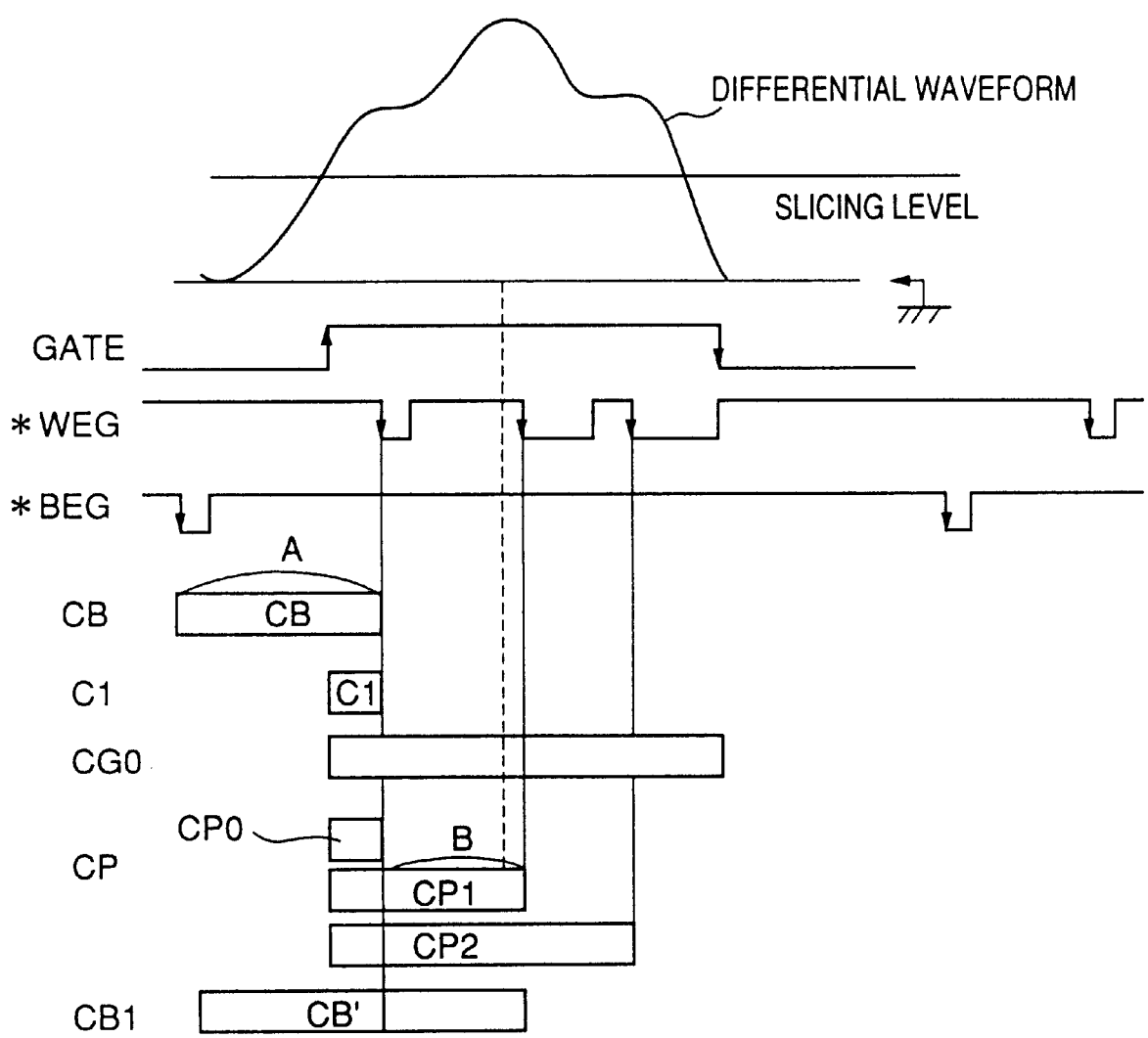
FIG. 11 is a waveform diagram illustrating an operation of the bar-code reader according to the first embodiment of the present invention.

Referring to FIG. 11, the bar width counter 5 counts the width between the falling edge of the edge signal "BEG" corresponding to the previous true changing point and the falling edge of the edge signal "WEG" corresponding to a false changing point for the first peak. The count value "CB" of the bar width counter 5 is indicated by A in FIG. 11.

When the gate signal "GATE" has the value of "1", the gate width counter 41 and the initial value counter 42 carry out the counting operation and respectively outputs the count values "CG0" and "CI". At this time, the pulse width counter also carries out the counting operation so as to successively output the count values "CP0" and "CP1". Further, the first operating circuit 44 calculates the half "CG0/2" of the count value "CG0" of the gate width counter 41. In addition, the fourth operating circuit 49 calculates the difference "CP1–CP0". The difference is indicated by B in FIG. 11.

The second operating circuit 47 calculates "CP1–CG0/2". The third operating circuit 48 calculates "CP0–CG0/2". The comparing circuit 50 outputs a pulse signal when the smallest one of the "CP1–CG0/2" and "CP0–CG0/2" is detected.

Thus, in the unit formed of the true/false peak determination circuit 6 and the correcting circuit 7 shown in FIG. 10, the values indicated by A and B in FIG. 11 are added by the adding circuit 51 at a timing of the rising edge of the pulse signal generated by the comparing circuit 50. As a result, a changing point closest to the center of the gate signal "GATE" is decided as the true changing point, so that the false changing point detected at the first peak is corrected to the true changing point.

That is, the position "CB1" of the corrected true changing point is calculated in accordance with the following equation.

$$CB1=CB+(CP1-CP0)$$

Figure 12:
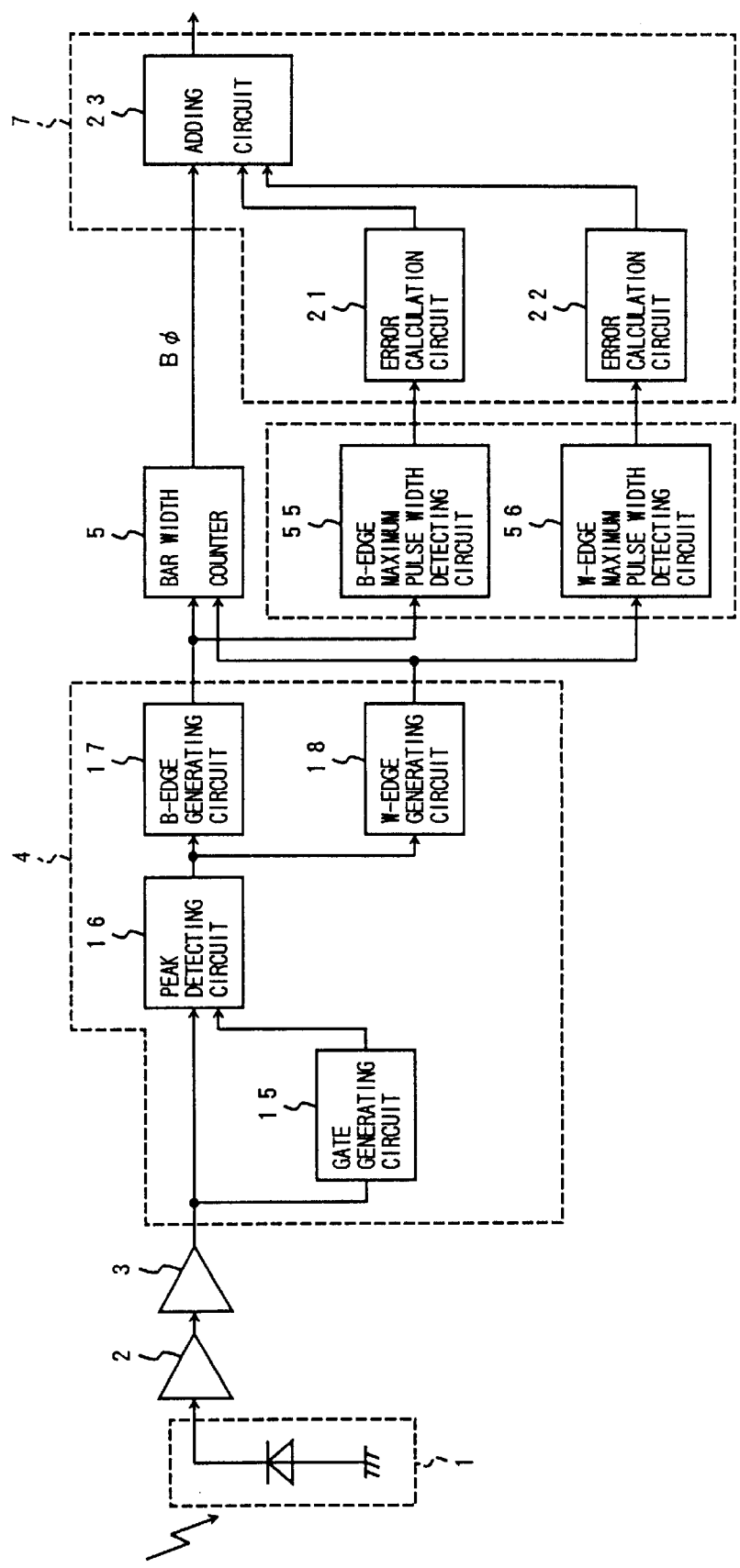
FIG. 12 is a block diagram illustrating the bar-code reader according to a second embodiment of the present invention.

FIG. 12 shows the bar-code reader according to a second embodiment of the present invention.

Referring to FIG. 12, the bar-code reader has the photoelectric conversion circuit 1, the AMP 2, the differentiating circuit 3, the peak detecting unit 4, the bar width counter 5, the true/false peak detecting unit 6 and the correcting unit 7 in the same manner as that shown in FIG. 2. In FIG. 12, those parts which are the same as those shown in FIGS. 2 and 7 are given the same reference numbers.

The peak detecting unit 4 has the peak detecting circuit 16, the gate generating circuit 15, the B-edge generating circuit 17 and the W-edge generating circuit 18, and detects plus and minus peak points of the differential waveform signal. The peak detecting circuit 16 detects plus and minus peak points, corresponding to changing points of the bar code, of the differential waveform signal. The gate generating circuit 15 generates the enable signal used to detect the peak points by the peak detecting circuit 16. The B-edge generating circuit 17 generates the edge signal "BEG" corresponding to the minus peak point detected by the peak detecting circuit 16. The W-edge generating circuit 18 generates the edge signal "WEG" corresponding to the plus peak point detected by the peak detecting circuit 16. The peak detecting circuit 16 carries out a process for detecting peak points when the gate signal (the enable signal) is in the enable state, that is, when the gate signal has the value of "1". The gate generating circuit 15 monitors the differential waveform signal generated by the differentiating circuit 3. When the level of the differential waveform signal exceeds the specific voltage level, the gate generating circuit 15 outputs the gate signal having the value of "1". The gate signal is supplied to the peak detecting circuit 16. The above specific voltage level is set at a value so that changing points can be detected from the differential waveform signal. The differential waveform signal generated by the differentiating circuit 3 has a plus peak point corresponding to a changing point at which the scanning point is changed from a black stripe to a white stripe in the bar code and a minus peak point corresponding to a changing point at which the scanning point is changed from a white stripe to a black stripe, as shown in FIG. 4C.

The true/false peak determination unit 6 has a B-edge maximum pulse width detecting circuit 55 and a W-edge maximum pulse width detecting circuit 56, and determines whether a changing point corresponding each peak point detected by the peak detecting unit 4 is the true changing point or the false changing point. The B-edge maximum pulse width detecting circuit 55 counts the pulse widths of the edge signal "BEG" generated by the B-edge generating circuit 17 when a plurality of minus peak points of the differential waveform signal are generated for a signal true changing point of the bar code due to the influence of the Fresnel diffraction. The B-edge maximum pulse width detecting circuit 55 selects a changing point corresponding to the plurality of minus peak points. The W-edge maximum pulse width detection circuit 56 counts the pulse widths of the edge signal "WEG" generated by the W-edge circuit 18 when a plurality of plus peak points of the differential waveform signal are generated for a single turn changing point of the bar code due to the influence of the Fresnel diffraction. The W-edge maximum pulse width detecting circuit 56 selects a changing point corresponding to the maximum pulse width, as the true changing point, from among changing points corresponding to the plurality of plus peak points.

The correcting unit 7 has the error calculation circuits 21 and 22 and the adding circuit 23, and corrects a changing point which is determined as the false changing point by the true/false peak determination unit 6 to a position of the true changing point. The error calculation circuit 21 calculates the difference between the true changing point detected by the B-edge maximum pulse width detecting circuit 55 and each false changing point. The error calculation circuit 22 calculates the difference between the true changing point detected by the W-edge maximum pulse width detecting circuit 56 and each false changing point. The adding circuit 23 adds the differences calculated by the error calculation circuits 21 and 22.

In the bar-code reader as shown in FIG. 12, changing points corresponding to edge signals having the maximum pulse widths out of edge signals generated by the B-edge generating circuit 17 and the W-edge generating circuit 18 are decided as the true changing points.

In the bar-code reader shown in FIG. 12, the W-edge maximum pulse width detecting circuit 56 of the true/false peak determination circuit 6 determines whether a changing point is the false changing point generated due to the influence of the Fresnel diffraction or the true changing point. The correcting unit 7 then carries out the process for correcting the false changing point to the true changing point. A description will now be given, with reference to FIGS. 13 and 14, of the above processes. The process in the B-edge maximum pulse width detecting circuit 55 is the same as that in the W-edge maximum pulse width detecting circuit 56, so that the description of the process in the B-edge maximum pulse width detecting circuit 55 is omitted.

Figure 14:
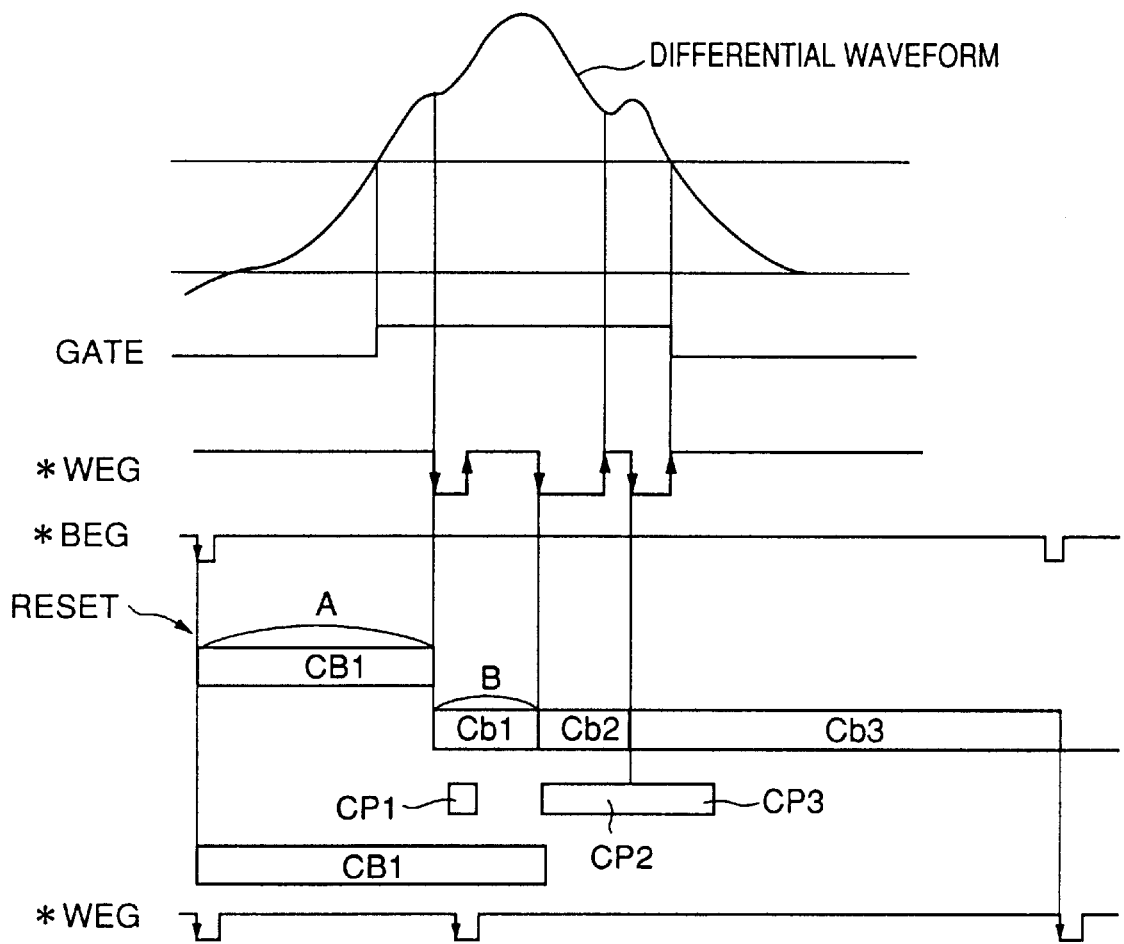
FIG. 14 is a waveform diagram illustrating an operation of the bar-code reader according to the second embodiment of the present invention.

When the scanning light affected by the Fresnel diffraction scans the bar code from a black stripe to a white stripe as shown in FIG. 14, the gate generating circuit 15 monitors the differential waveform signal generated by the differentiating circuit 3. When the level of the differential waveform signal exceeds the specific voltage level, the gate generating circuit 15 outputs the gate signal "GATE" having the value of "1" so as to inform the peak detecting circuit 16 that the gate signal is in the enable state. The peak detecting circuit 16 receiving the gate signal "GATE" having the value of "1" detects peak points of the differential waveform signal. Further, the W-edge generating circuit 18 and the B-edge generating circuit 17 respectively output the edge signals "WEG" and "BEG" corresponding to the peak points detected by the peak detecting circuit 16.

Thus, the peak detecting circuit 4 outputs the gate signal "GATE", the degree signal "WEG" corresponding to the plus changing points and the gate signal "BEG" corresponding to the minus changing points to a unit formed of the true/false peak determination circuit 6 and the correcting circuit 7. The unit formed of the true/false peak determination circuit 6 and the correcting circuit 7 as shown in FIG. 13 determines, based on the received signals, whether a changing point is the false changing point generated due to the influence of the Fresnel diffraction or the true changing point and corrects the false changing point to the true changing point.

Figure 13:
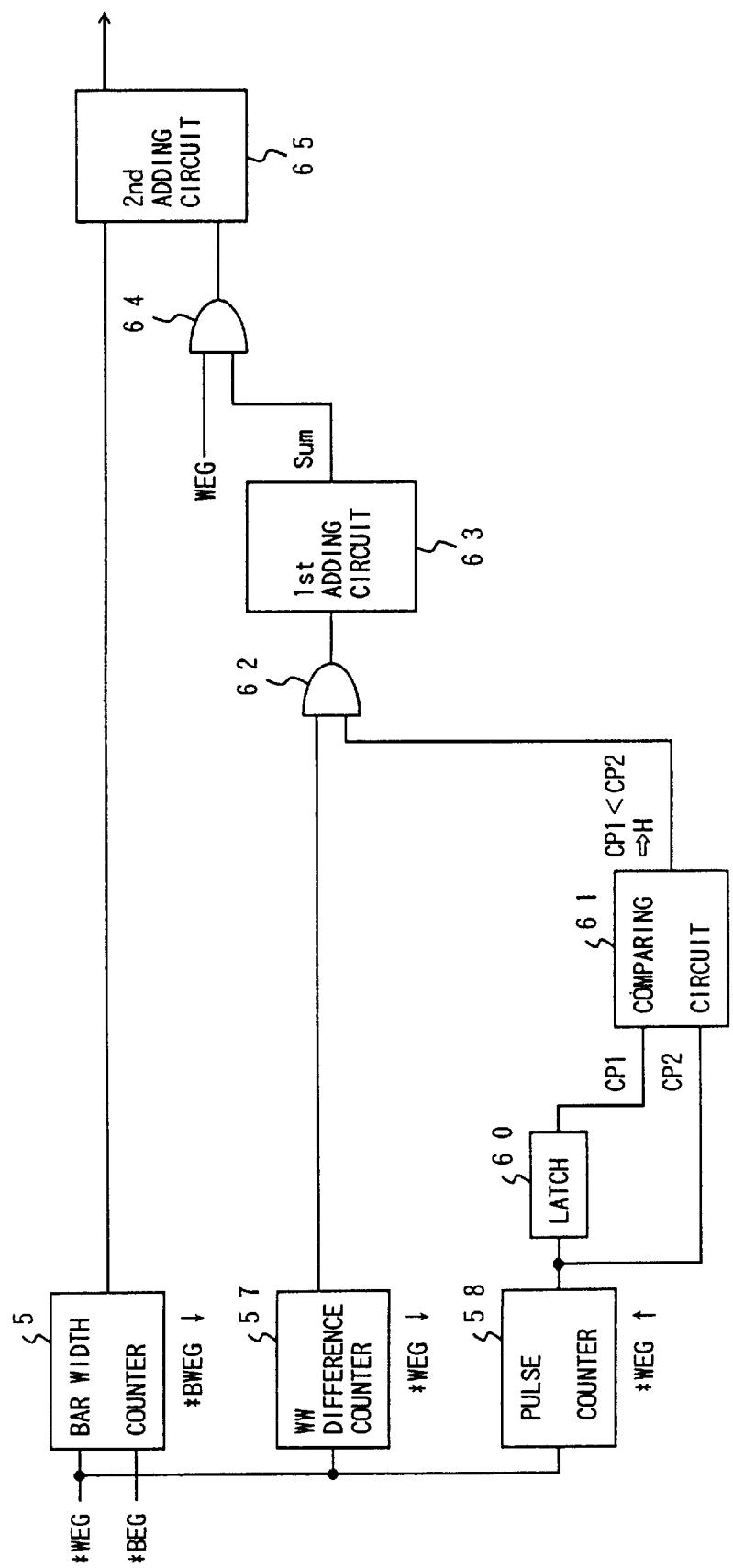
FIG. 13 is a block diagram illustrating an example of the circuit corresponding to the true/false peak determination unit and the correcting unit of the bar-code reader according to the second embodiment of the present invention.

Referring to FIG. 13, the unit formed of the true/false peak determination circuit 6 and the correcting circuit 7 has a WW difference counter 57, a pulse counter 58, a latch 60, a comparing circuit 61, an AND gate 62, a first adding circuit 63, an AND gate 64 and a second adding circuit 65. The WW difference counter 57 counts the difference between he rising edge of the edge signal "WEG" and the falling edge of the edge signal "WEG". The count values of the WW difference counter 57 are represented by "Cb1", "Cb2", and "Cb3". The pulse counter 58 counts the distance between the falling edge of the edge signal "WEG" and the rising edge of the edge signal "WEG.". The count values of the pulse counter 58 are represented by "CP1", "CP2", and "CP3". The latch 60 latches the count values "CP1", "CP2" and "CP3" of the pulse counter 58. The comparing circuit 61 compares the count values "CP1" and "CP2" and "CP3". When the later count value is greater than the former count value, the AND gate 62 outputs the count value of the WW difference counter 57 based on the output signal of the comparing circuit 61. The first adding circuit 63 adds the count value of the WW difference counter 57 and the value "CB" to each other. The AND gate 64 outputs the adding result value of the first adding circuit 63 at every falling edge of the edge signal "WEG". The second adding circuit 64 corrects the false changing point to the true changing point.

Referring to FIG. 14, the bar width counter 5 counts the width between the falling edge of the edge signal "BEG" corresponding to the true changing point at which the scanning point is changed from a white stripe to a black stripe and the falling edge of the edge signal "WEG" corresponding to the false changing point detected in the first peak. The bar width counter 5 outputs the count value "CB".

The WW difference counter 57 starts counting at every falling edge of the edge signal "WEG" and successively outputs the count values "Cb1" and "Cb2". Further, the WW difference counter 57 starts counting at a falling edge of the edge signal "WEG" and stop counting at the falling edge of the edge signal "BEG" so as to output the count value "Cb3". The pulse counter 58 the difference between the falling edge of the edge signal "WEG" and the rising edge thereof. The pulse counter 58 successively outputs the count values "CP1", "CP2" and "CP3". The count value of the pulse counter 58 is latched by the latch 60 at every falling edge of the edge signal "WEG".

The latch 60 latches the pulse width which has been counted, so that the comparing circuit 61 compares the former count value and the later counter value, for example, the count values "CP1" and "CP2". When the later count value "CP2" is greater than the former count value "CP1", the latch 60 outputs a signal having the value "1" to one of input terminals of the AND gate 62. In this case, the count value of the WW difference counter 57 is supplied to the first adding circuit 63 via the AND gate 62 and the count value is accumulated in the first adding circuit 63. In a case where the former count value "CP2" is greater than the later count value "CP3", the comparing circuit 61 outputs the signal having the value of "0" to one of input terminals of the AND gate 62. In this case, the AND gate 62 is in an inhibiting state, so that the count value of the WW difference counter 57 is not accumulated in the first adding circuit 63.

The above process is carried out at every rising edge of the edge signal "WEG", and the second adding circuit 65 adds the total count value accumulated in the first adding circuit 63 to the value "CB".

Thus, in the unit formed of the true/false peak determination circuit 6 and the correcting circuit 7, a changing point corresponding to the edge signal having the maximum pulse width out of the edge signals generated by the W-edge generating circuit 18 is decided as the true changing point, so that the false changing point detected at the first peak point is corrected to the true changing point.

Figure 15:
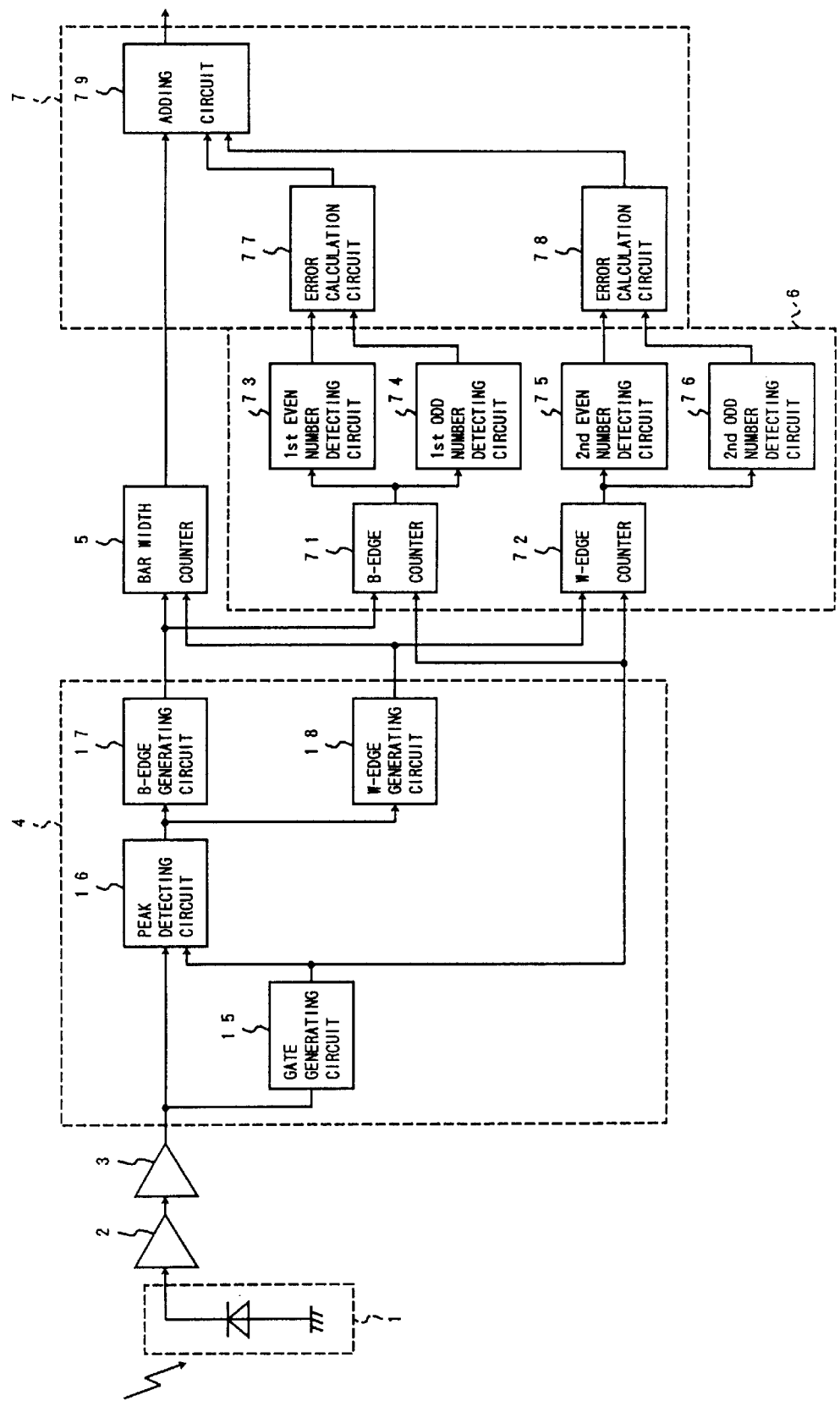
FIG. 15 is a block diagram illustrating the bar-code reader according to a third embodiment of the present invention.

FIG. 15 shows the bar-code reader according to a third embodiment of the present invention.

Referring to FIG. 15, the bar-code reader has the photo-electric conversion circuit 1, the AMP2, the differentiating circuit 3, the peak detecting unit 4, the bar width counter 5, the true/false peak determination unit 6 and the correcting unit 7 in the same manner as that shown in FIG. 2. In FIG. 15, those parts which are the same as those shown in FIGS. 2 and 7 are given the same reference numbers.

The peak detecting unit 4 has the peak detecting circuit 16, the gate generating circuit 15, the B-edge generating circuit 17 and The W-edge generating circuit 18 and detects plus and minus peak points of the differential waveform signal. The peak detecting circuit 16 detects the plus and minus peak points, corresponding to changing points of the bar code, of the differential waveform signal. The gate generating circuit 15 generates the gate signal uses as the enable signal for the peak detecting circuit 16. The B-edge generating circuit 17 generates the edge signal "BEG" corresponding to the minus peak point detected by the peak point detecting circuit 16. The W-edge generating circuit 18 generates the edge signal "WEG" corresponding to the plus peak point detected by the peak point detecting circuit 16. The peak point detecting circuit 16 carries out the process for detecting the peak points when the gate signal generated by the gate generating circuit 15 is in the enable state, for example, when the gate signal has the value of "1". The gate generating circuit 15 monitors the differential waveform signal generated by the differentiating circuit 3. When the level of the differential waveform signal exceeds the specific voltage level, the gate generating circuit 15 outputs the gate signal having he value of "2" to the peak detecting circuit 16. The specific voltage level is set at a value so that changing points are detected from the differential waveform signal has plus peak points at changing points at each of which the scanning point is changed from a black stripe to a white stripe in the bar code and minus peak points at changing points at each of which the scanning point is changed from a white stripe to a black stripe in the bar code as shown in FIG. 4C.

The true/false peak determination unit 6 has a B-edge counter 71, a first even number detecting circuit 73, a first odd number detecting circuit 74, a W-edge counter 72, a second even number detecting circuit 75 and a second odd number detecting circuit 76. In a case where a plurality of minus changing points are detected due to the influence of the Fresnel diffraction, the B-edge counter 71 counts the number of falling edges of the edge signal "BEG" generated by the B-edge generating circuit 17 when the gate signal "GATE" generated by the gate generating circuit 15 has the value of "1". When the number of changing points corresponding to the edge signal "BEG" is an even number, the first even number detecting circuit 73 detects the first changing point as the true changing point. When the number of changing points corresponding to the edge signal "BEG" is an odd number, the first odd number detecting circuit 74 detects the center one of the changing points as the true changing point. In a case where a plurality of plus changing points are detected due to the influence of the Fresnel diffraction, the W-edge counter 72 counts the number of falling edges of the edge signal "WEG" generated by the W-edge generating circuit 18 when the gate signal "GATE" has the value of "1". The second even number detecting circuit 75 detects the first changing point as the true changing point when the number of changing points corresponding to the edge signal "WEG" is an even number. When the number of changing points corresponding to the edge signal "WEG" is an odd number, the second odd number detecting circuit 76 detects the center one of the changing points as the true changing point.

The correcting unit 7 has error calculation circuits 77 and 78 and an adding circuit 70 and corrects the changing point which is determined as the false changing point by the true/false peak detecting unit 6 to the position of the true changing point. The error calculation circuit 77 calculates the difference between the true changing point detected by the first even number detecting circuit 73 or the first odd number detecting circuit 74 and the false changing point. The error calculation circuit 78 calculates the difference between the true changing point detected by the second even number detecting circuit 75 or the second odd number detecting circuit 76 and the false changing point. The adding circuit 79 adds the differences calculated by the error calculation circuits 77 and 78.

In the bar-code reader as shown in FIG. 15, when the numbers of edges counted by the B-edge counter 71 and the W-edge counter 72 are odd numbers. the center one of the changing points is decided as the true changing point. In addition, the numbers of the edges are even number, the first changing point is decided as the true changing point.

In the bar-code reader shown in FIG. 15, it is determined, by the W-edge counter 72, the second even number detecting circuit 75 and the second odd number detecting circuit 76 of the true-false peak determination unit 6, whether a changing point is the false changing point generated due to the influence of the Fresnel diffraction or the true changing point. The correcting unit 7 then carries out the process for correcting the false changing point to the true changing pint. A description will now be given, with reference to FIGS. 16 and 17, of the above processes. The processes for determining, using the B-edge counter 71, the first even number detecting circuit 73 and the first odd number detecting circuit 74, whether a changing point is the false changing point generated due to the influence of the Fresnel diffraction or the true changing point is the same as that shown in FIG. 17, so that description of the processes is omitted.

Figure 17:
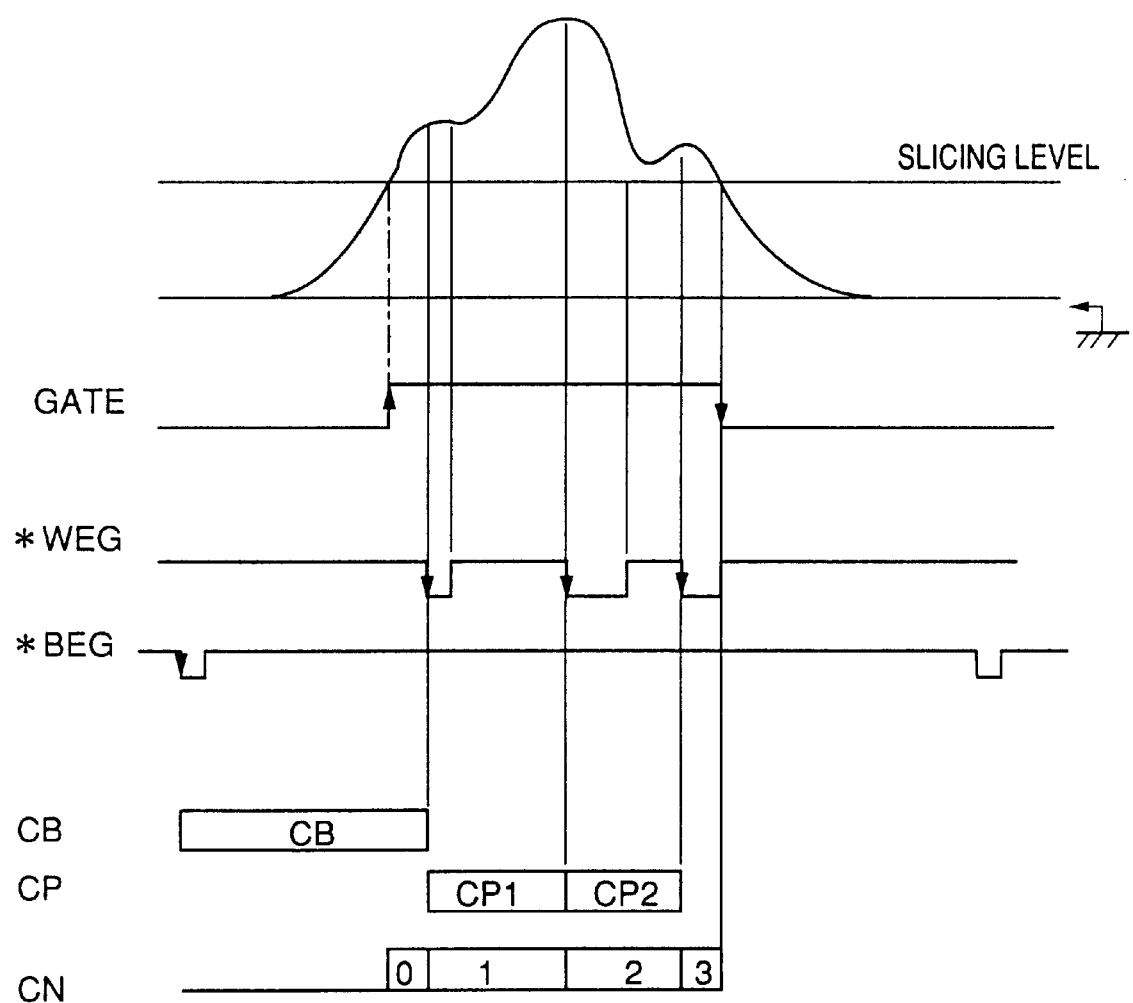
FIG. 17 is a waveform diagram illustrating an operation of the bar-code reader according to the third embodiment of the present invention.
Figure 18:
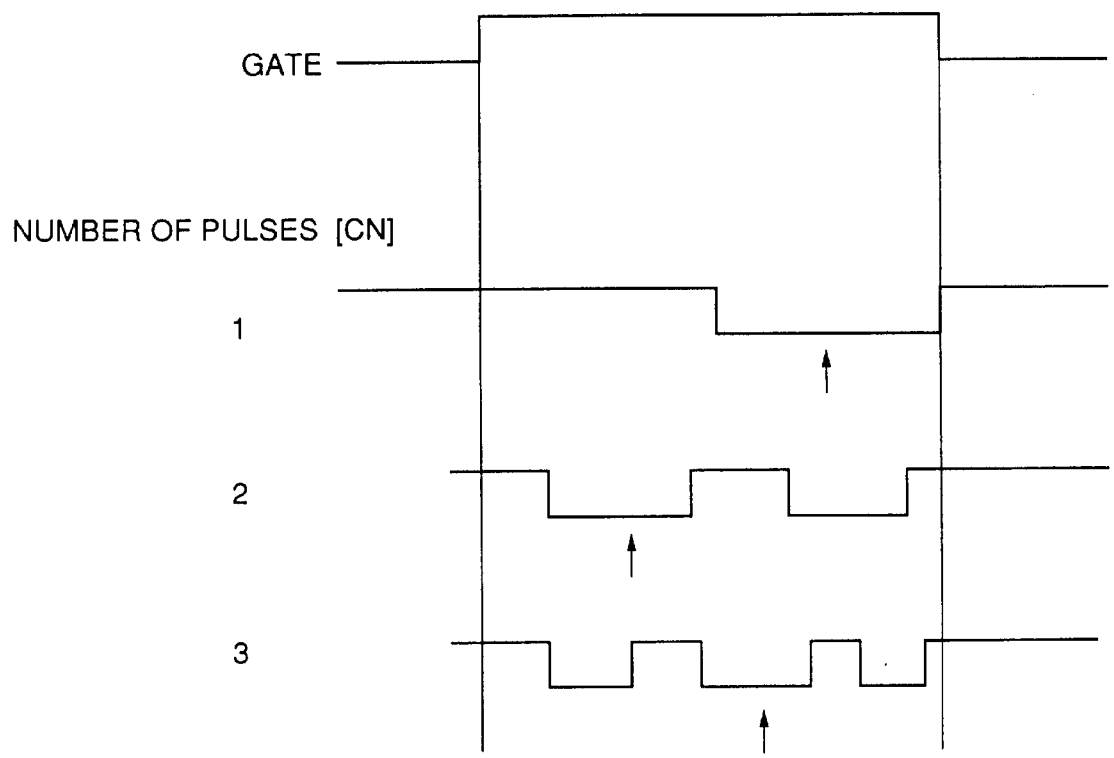
FIG. 18 is a timing chart illustrating an operation of the bar-code reader according to the third embodiment of the present invention.

For example, when the scanning light affected by the Fresnel diffraction scans the bar code from a black stripe to a white stripe as shown in FIG. 17, the gate generating circuit 15 monitors the differential waveform signal generated by the differentiating circuit 3. When the level of the differential waveform signal exceeds the specific voltage level, the gate generating circuit 15 outputs the gate signal "GATE" having the value of "1" in the enable state to the peak detecting circuit 16. When the gate signal has the value of "1", the peak detecting circuit 16 detects peak levels of the differential waveform signal. Further, the W-edge generating circuit 18 and the B-edge generating circuit 17 respectively output the edge signals "WEG" and "BEG" corresponding to the peak points detected by the peak detecting circuit 16.

Figure 16:
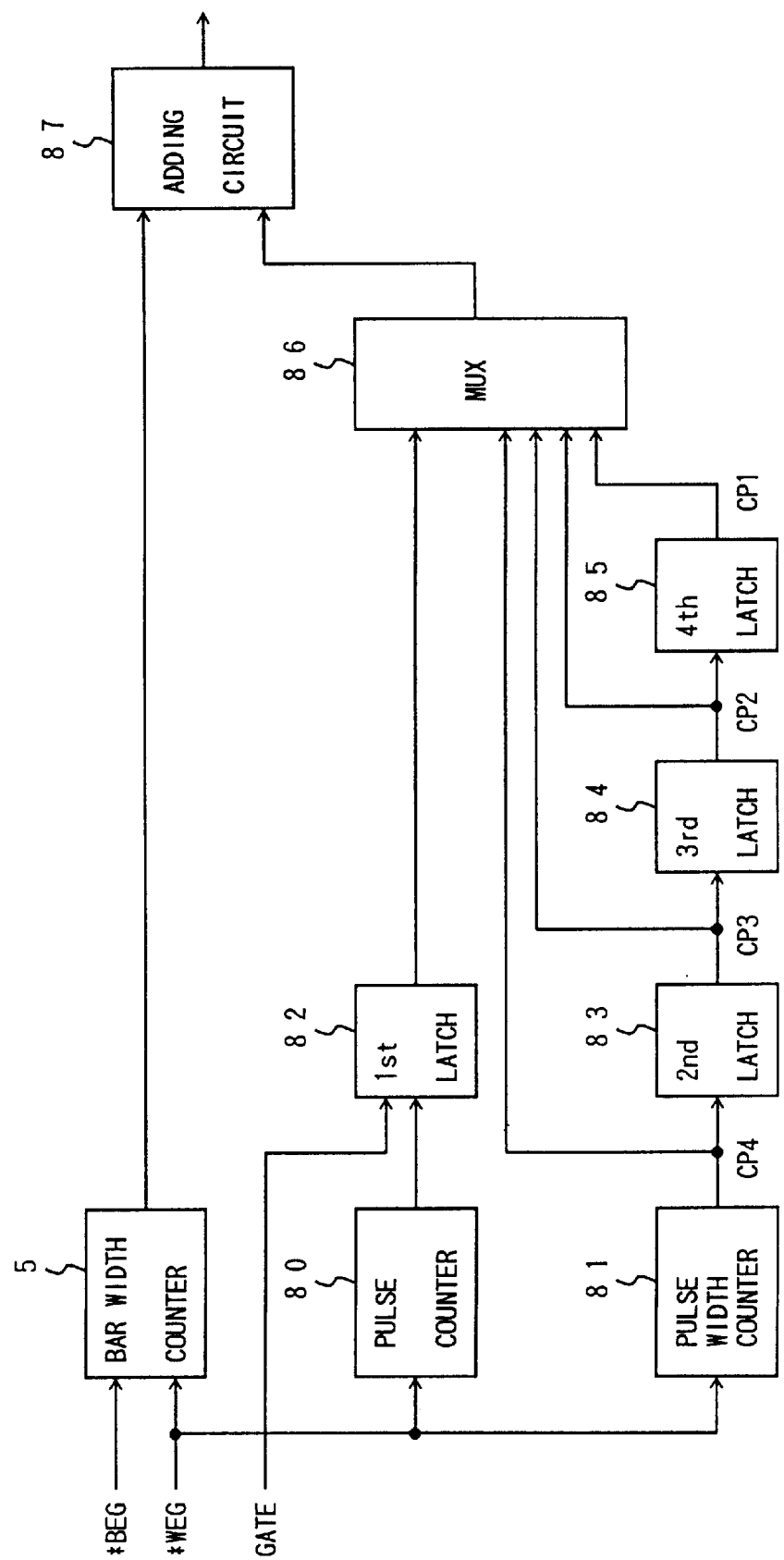
FIG. 16 is a block diagram illustrating an example of the circuit corresponding to the true/false peak determination unit and the correcting unit of the bar-code reader according to the third embodiment of the present invention.

Thus, the peak detecting circuit 4 shown in FIG. 15 outputs the gate signal "GATE", the edge signal "WEG" corresponding to the plus changing point and the edge signal "BEG" corresponding to the plus changing point changing point to a unit formed of the true/false peak determination circuit 6 and the correcting circuit 7 as shown in FIG. 16. In the unit formed of the true/false peak determination circuit 6 and the correcting circuit 7, it is determined, based on the received signals, whether a changing point is the false changing point generated due to the influence of the Fresnel diffraction or the true changing point and corrects the false changing point to the true changing point.

Referring to FIG. 16, the unit formed of the true/false peak determination circuit 6 and the correcting circuit 7 has a pulse counter 80, a pulse width counter 81, a first latch 82, a second latch 83, a third latch 84, a fourth latch 85, a multiplexer 86 and an adding circuit 87. The pulse counter 80 counts the number of falling edges of the edge signal "WEG". The counter value of the pulse counter 80 is represented by "CN". The pulse width counter 81 counts the width between the falling edge of the edge signal "WEG" and the next falling edge of the edge signal "WEG". The count value of the pulse width counter 81 is successively represented by such as "CP1" and "CP2". The first latch 82 latches the count value of the pulse counter 80 at every falling edge of the gate signal "GATE". The second latch 83, the third latch 84 and the fourth latch 85 latch successively latch the count values of the pulse width counter 81. The multiplexer 86 selects one of the count values, latched by the second, third and fourth latches 83, 84 and 85, of the pulse width counter 81, as the count value corresponding to the true changing point in accordance with the number of falling edges of the edge signal "WEG" (the count value latched by the first latch). The adding circuit 87 corrects a false changing point which has been previously detected using the true changing point supplied from the multiplexer 86.

Referring to FIG. 17, the bar width counter 5 counts the difference between the falling edge of the edge signal "BEG" corresponding to the true changing point which has been previously detected and the falling edge of the edge signal "WEG" corresponding to a false changing point detected at the first peak. The bar width counter 5 outputs the count value "CB".

The pulse counter 80 counts the number of falling edges of the edge signal "WEG" in a period from the rising edge of the gate signal "GATE" to the falling edge of the gate signal "GATE". The pulse width counter 81 counts the pulse width of the edge signal "WEG" at every falling edge of the edge signal. The count value is successively shifted through the second, third and fourth latches 83, 84 and 85. The count value of the pulse counter 80 is latched by the first latch 81 at the falling edge of the gate signal "GATE". The multiplexer 86 selects the count values latched by the second, third and fourth latches 83, 84 and 85 as information representing the true changing point in accordance with the count value latched by the first latch 81. The adding circuit 87 corrects a false changing point which has been previously detected to the true changing point based on the true changing point selected by the multiplexer 86.

Thus, in a case where the number of edges counted by the B-edge counter 71 or the W-edge counter 72 is odd, a changing point corresponding to the center of edges is decided as the true changing point, so that the false changing point detected at the first peak point is corrected to the true changing point. In addition, in a case where the number of edges counted by the B-edge counter 71 or the W-edge counter 72 is even, a changing point corresponding to the first edge is decided as the true changing point.

Figure 19:
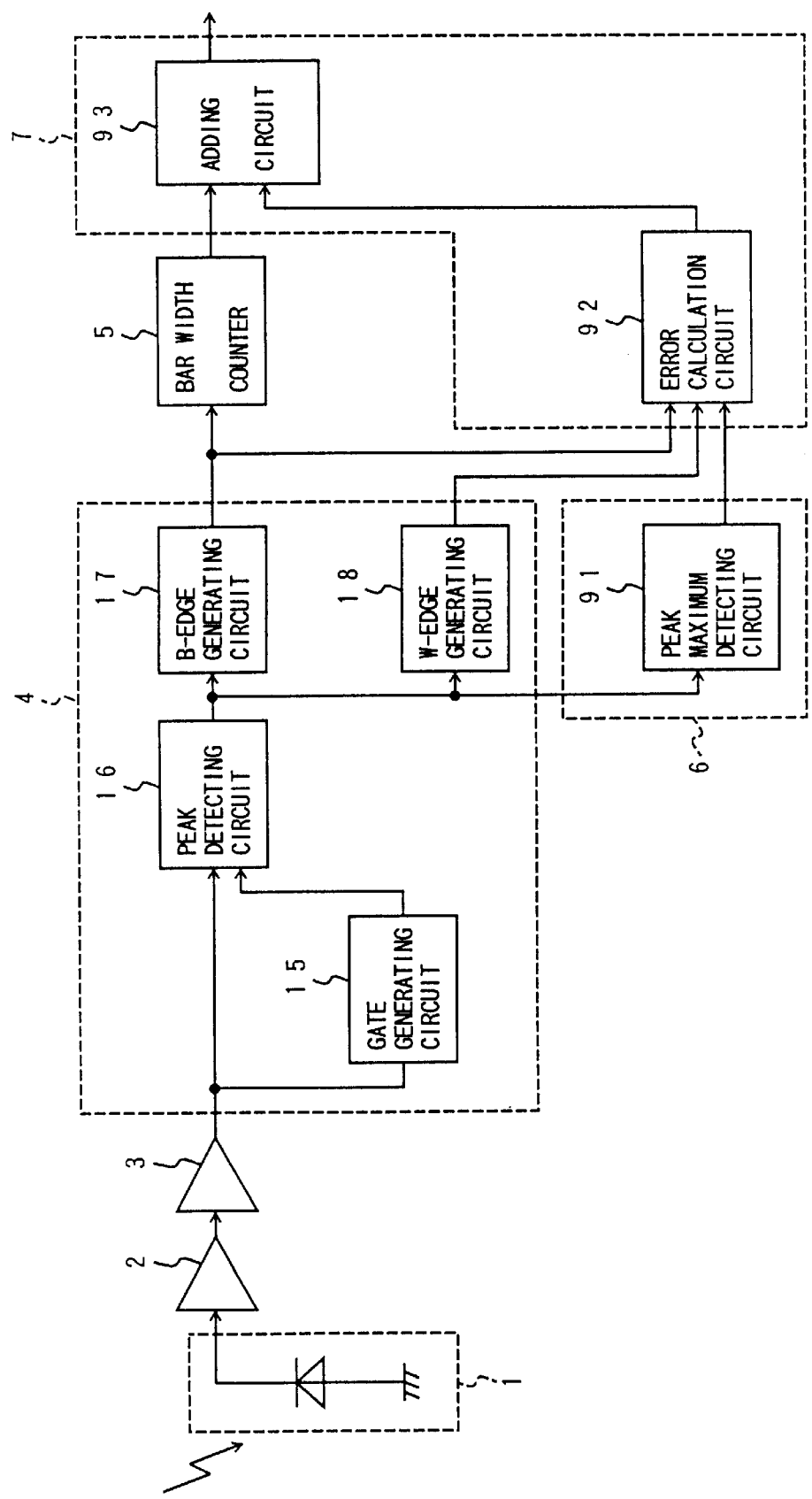
FIG. 19 is a block diagram illustrating the bar-code reader according to a fourth embodiment of the present invention.

FIG. 19 shows the bar-code reader according to a fourth embodiment of the present invention.

Referring to FIG. 19, the bar-code reader has the photo-electric conversion circuit 1, the AMP 2, the differentiating circuit 3, the peak detecting unit 4, the bar width counter, 5, the true/false peak determination unit 6 and the correction unit 7 in the same manner as that shown in FIG. 2. In FIG. 19, those parts which are the same as those shown in FIGS. 2 and 7 are given the same reference numbers.

The peak detecting unit 4 has the peak detecting circuit 16, the gate generating circuit 15, the B-edge generating circuit 17 and the W-edge generating circuit 18, and detects plus and minus peak points of the differential waveform signal. The peak detecting circuit 16 detects the plus and minus peak points, corresponding to changing points of the bar code, of the differential waveform signal corresponding. The gate generating circuit 15 generates a gate signal used as an enable signal for the peak detecting circuit 16. The B-edge generating circuit 17 generates the edge signal "BEG" corresponding to the minus peak points detected by the peak detecting circuit 16. The W-edge generating circuit 18 generates the edge signal "WEG" corresponding to the plus peak points detected by the peak detecting circuit 16. When the gate signal generated by the gate generating circuit 15 has the value of "1" in the enable state, the peak detecting circuit 16 carries out the process for detecting the peak points. The gate generating circuit 15 monitors the differential waveform signal generated by the differentiating circuit 3. When the level of the differential waveform signal exceeds the specific voltage level, the gate generating circuit 15 outputs the gate signal having the value of "1" to the peak detecting circuit 16. The specific voltage level is set at value so that changing points can be detected from the differential waveform signal has plus peak points corresponding to changing points at each of which the scanning point is moved form a black stripe to a white stripe on the bar code and minus peak points corresponding to changing points at each of which the scanning point is moved from a white stripe to a black stripe.

The true/false peak determination unit 6 has a peak maximum detecting circuit 91. In a case where a plurality of changing points are detected due to the influence of the Fresnel diffraction when the scanning light scans the boundary between a black stripe and a white stripe in the bar code, the peak maximum detecting circuit 91 detects a changing point corresponding to a peak point having the maximum level as the true changing point when the gate signal "GATE" generated by the gate generating circuit 15 has the value of "1".

The correcting unit 7 has an error calculation circuit 92 and an adding circuit 93 and corrects a changing point determined as the false changing point by the true/false peak determination unit 6 to the position of the true changing point. The error calculation circuit 92 the difference between the true changing point detected by the peak maximum detecting circuit 91 and a false changing point. The adding circuit 93 carries out an adding process for the difference calculated by the error calculation circuit 92.

In the bar-code reader shown in FIG. 19, a changing point corresponding to the maximum value of the peak point detected by the peak maximum detecting circuit 91 is decided as the true changing point.

In the bar-code reader shown in FIG. 19, the peak maximum detecting circuit 91 of the true/false peak determination circuit 6 determines whether a changing point is the false changing point generated due to the influence of the Fresnel diffraction or the true changing point. The correcting unit 7 has the detailed structure as shown in FIG. 20 and is operated as shown in FIG. 21.

Figure 21:
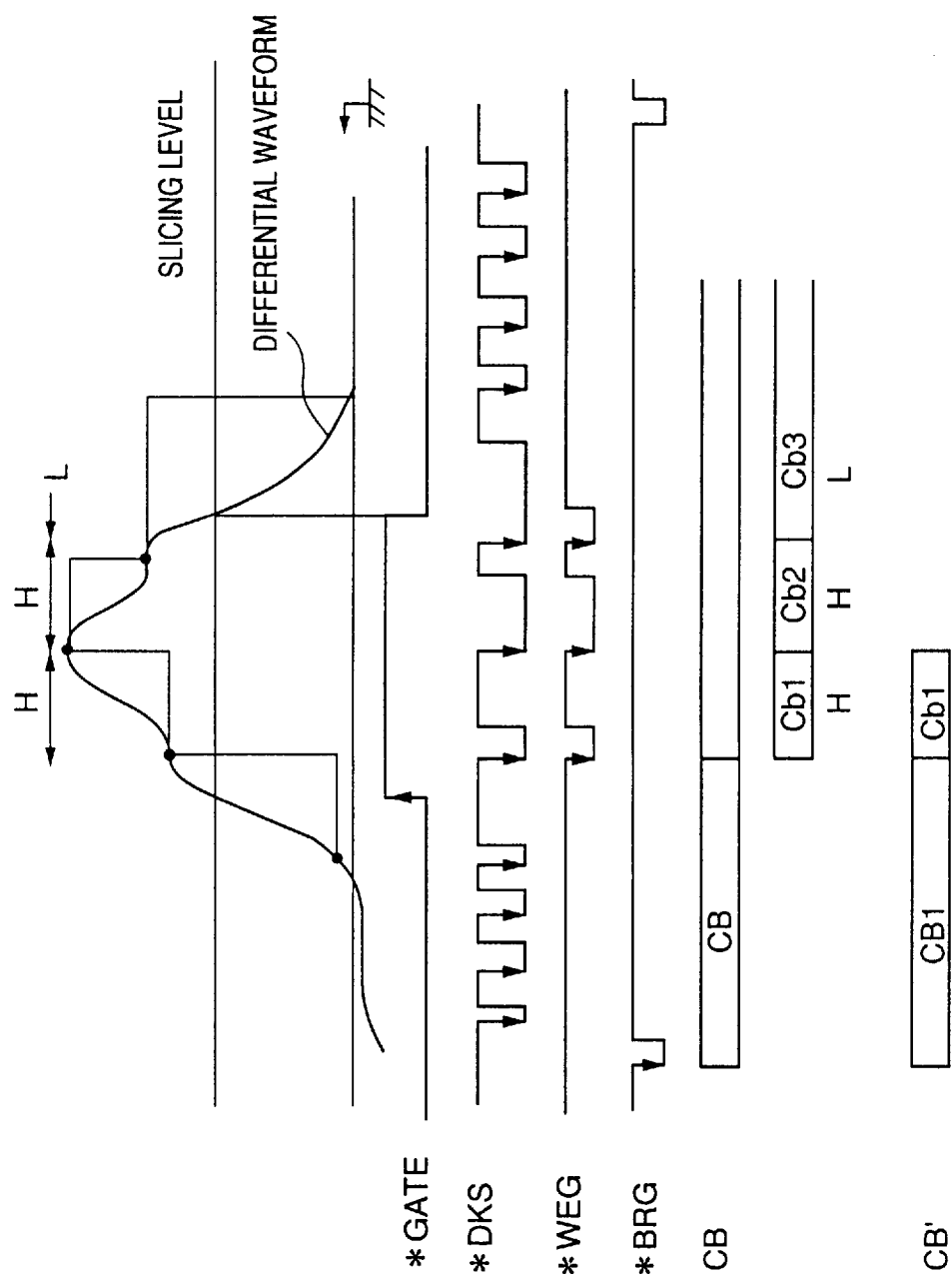
FIG. 21 is a waveform diagram illustrating an operation of the bar-code reader according to the fourth embodiment of the present invention.

In a case where the scanning light affected by the Fresnel diffraction scans the bar code from a black stripe to a white stripe as shown in FIG. 21, the gate generating circuit 15 monitors the differential waveform signal generated by the differentiating circuit 3. When the level of the differential waveform signal exceeds the specific voltage level, the gate generating circuit 15 outputs the gate "GATE" having the value of "1" to the peak detecting circuit 16. The peak detecting circuit 16 receiving the gate signal "GATE" having the value of "1" detects peak points of the differential waveform signal and outputs a peak detecting signal "PKS". Further, the W-edge generating circuit 18 and the B-edge generating circuit 17 respectively output the edge signals "WEG" and "BEG" corresponding to the peak points detected by the peak detecting circuit 16.

Figure 20:
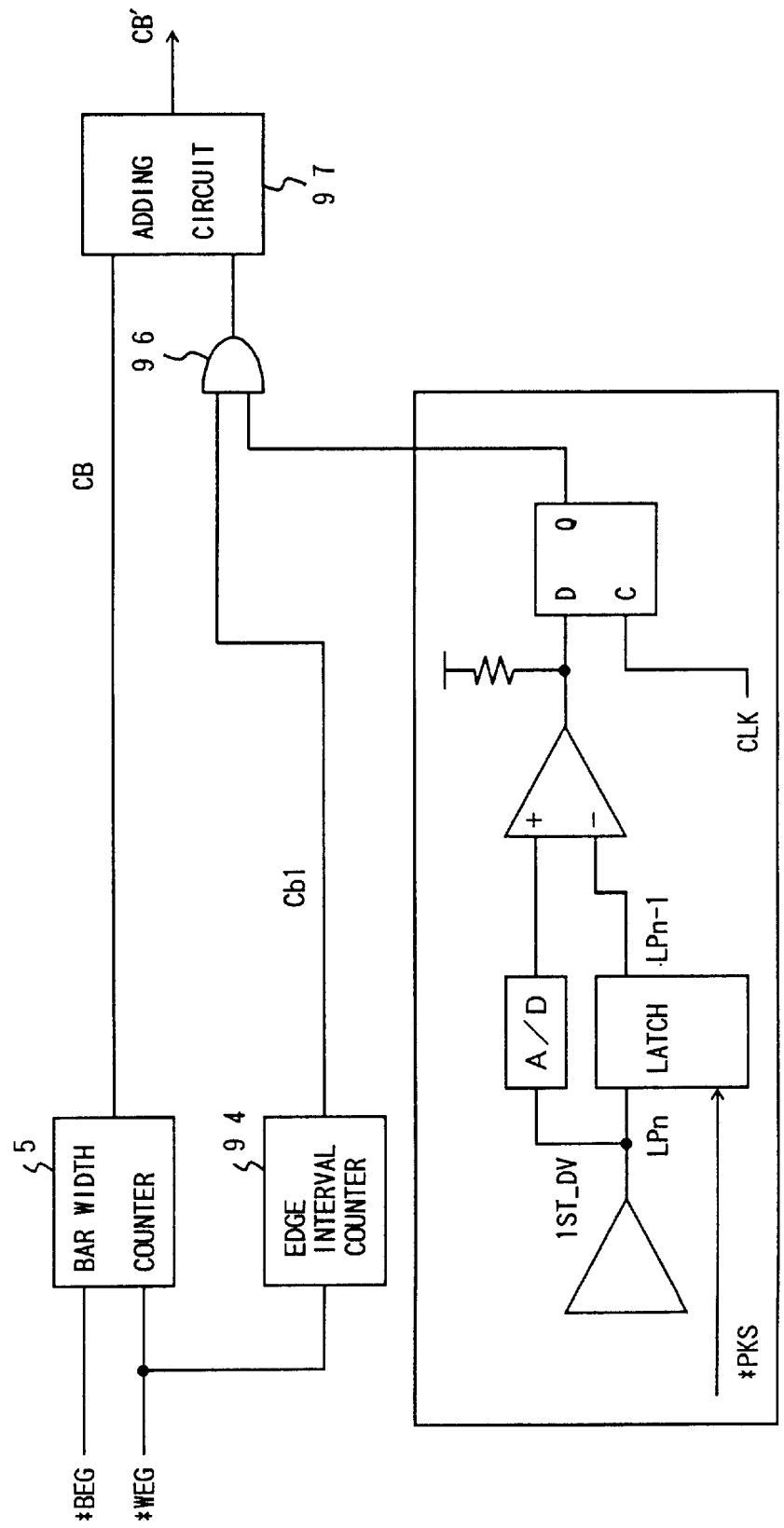
FIG. 20 is a block diagram illustrating an example of the circuit corresponding to the true/false peak determination unit and the correcting unit of the bar-code reader according to the fourth embodiment of the present invention.

Thus, the peak detecting unit 4 shown in FIG. 19 supplies th epeak detecting signal "PKS", the gate signal "GATE", the edge signal "WEG" corresponding to the plus peak points and the edge signal "BEG" corresponding to the minus peak points to the unit formed of the true/false peak determination circuit 6 and the correcting circuit 7 as shown in FIG. 20. The unit formed of the true/false peak determination circuit 6 and the correcting circuit 7 determines, based on the receiving signals, whether a changing point is the false changing point generated due to the influence of the Fresnel diffraction or the true changing point and carries out a process for correcting the changing point determined as the false changing point to the true changing point.

Referring to FIG. 20, the unit formed of the true/false peak determination circuit 6 and the correcting circuit 7 has an edge interval counter 94, a maximum value detecting circuit 95, an AND gate 96 and an adding circuit 97. The edge interval counter 94 counts the width between the falling edge of the edge signal "WEG" and the next falling edge of the edge signal "WEG". The count value of the edge interval counter 94 is successively represented by "Cb1" and "Cb2". The maximum value detecting circuit 95 detects the maximum value of the peak point based on the peak detecting signal "PKS". The AND gate 96 outputs the count value supplied from the edge interval counter 94 when the maximum value detecting circuit 95 detects the maximum value. The adding circuit 97 adds the count value output from he AND gate 96 to the value corresponding to the false changing point which has been previously detected so that the false point is corrected to the true changing point.

In FIG. 21, the bar width counter 5 counts the width between the falling edge of the signal "BEG"corresponding to the true changing point which has been previously detected and the falling edge of the edge signal "WEG" corresponding to the false changing point detected at the first peak The width counter 5 outputs the count value "CB". In addition, the maximum value detecting circuit 95 latches the voltage of a peak point of the differential waveform signal. If the voltage of the next peak point is greater than the latched voltage of the peak point, the maximum value detecting circuit 95 outputs the signal having the value "1".

The edge interval counter 94 counts the pulse width of the edge signal "WEG" at every falling edge of the edge signal "WEG". When the signal output by the maximum value detecting circuit 9 has the value of "1", the AND gate 96 outputs the count value "Cb1" supplied from the edge interval counter 94. The count value "Cb1" output from the AND gate 96 is added to the count value "CB" so that the false changing point is corrected to the true changing point.

Thus, in the unit formed of the true/false peak determination circuit 6 and the correcting circuit 7, a changing point corresponding to the peak point having the maximum value detected by the peak maximum detecting circuit 91 is decided as the true changing point, so that the false changing point detected at the first peak point is corrected to the position of the true changing point.

Figure 22:
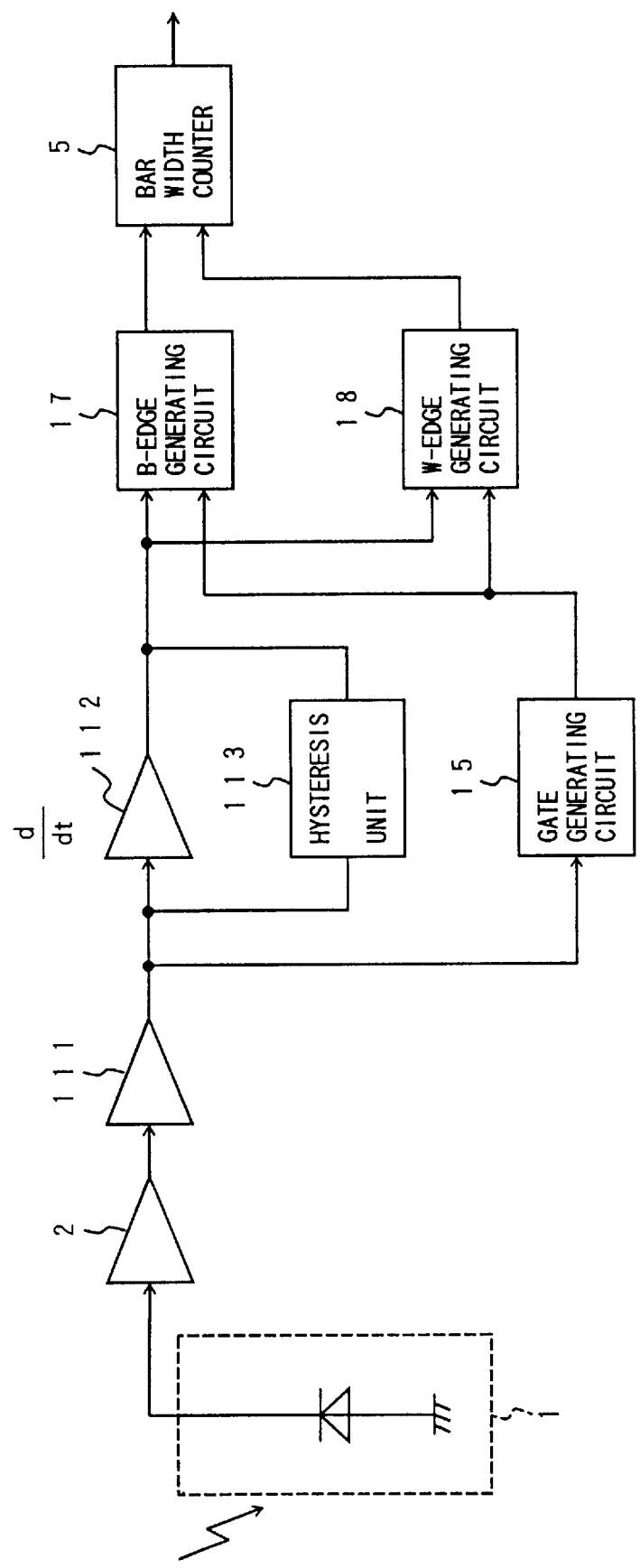
FIG. 22 is a block diagram illustrating the bar-code reader according to a fifth embodiment of the present invention.

FIG. 22 shows the bar-code reader according to the fifth embodiment of the present invention.

Referring to FIG. 22, the bar-code reader has the photoelectric conversion circuit 1, the AMP 2, a first differentiating circuit 111, a second differentiating circuit 112, a hysteresis unit 113, the gate generating circuit 15, the B-edge generating circuit 17, the W-edge generating circuit 18 and the bar width counter 5. In FIG. 22, those parts which are the same as those shown in FIGS. 2 and 7 are given the same reference numbers.

The first differentiating circuit 111 and the second differentiating circuit 112 have the same function as the differentiating circuit 3 shown in FIG. 2.

The hysteresis unit 113 compares the voltage of an electric signal output by the first differentiating circuit 111 and a predetermined fixed voltage. If the voltage of the electric signal output by the first differentiating circuit 111 is greater than the predetermined fixed voltage, the hysteresis unit 113 absorbs an changing point generated due to the influence of the Fresnel diffraction.

In the bar-code reader having the structure as shown in FIG 22, the hysteresis unit 113 absorbs the changing point generated due to the influence of the Fresnel diffraction, so that the turn changing point is detected.

Figure 23:
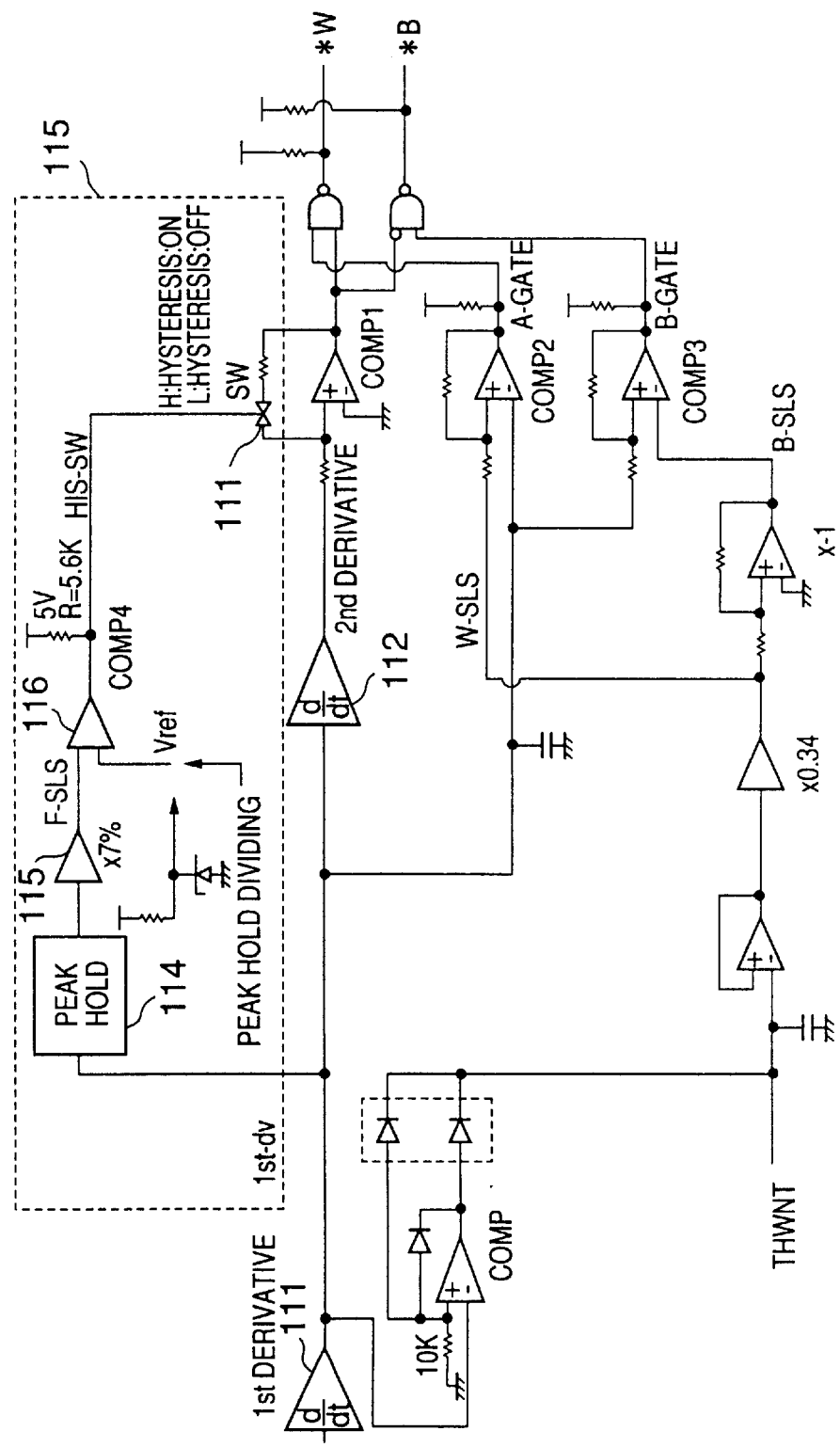
FIG. 23 is a circuit diagram illustrating a circuit for a hysteresis characteristic.
Figure 24:
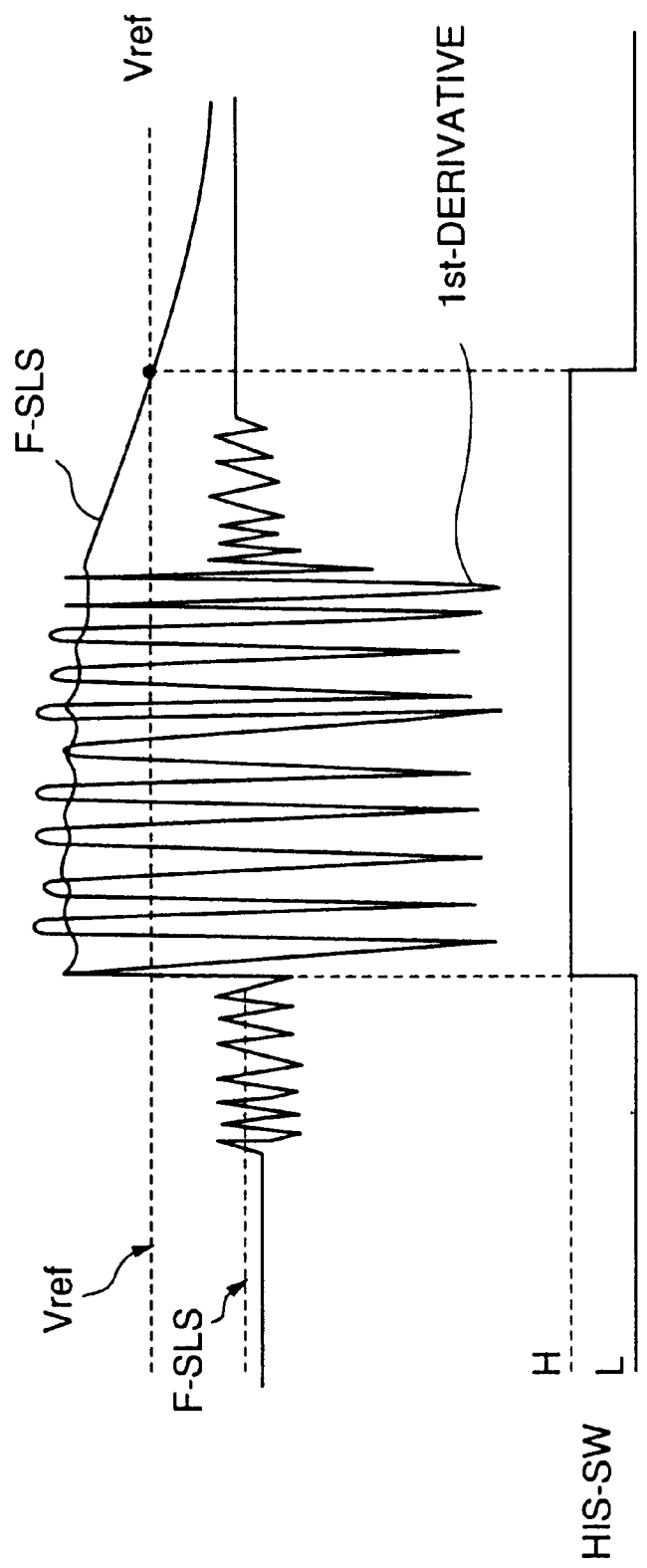
FIG. 24 is a waveform diagram illustrating an operation of the bar-code reader according to the fifth embodiment of the present invention.

The detailed structure of the hysteresis unit 113 is shown in FIG. 23. In FIG. 23, portions other than a portion surrounded by a dashed line are the same as in a conventional circuit. A description will be given, with reference to FIG. 23 and FIG. 24 showing waveforms of signals, operation of the bar-code reader.

In a case where a part of the light beam affected by the Fresnel diffraction scans the bar code, a large amount of light is generally returned to the bar-code reader. Thus, the amplitude of the differential waveform signal from the first differentiating circuit 111 is large. The second differentiating circuit 112 (COMP 1) differentiates the signal from the first differentiating circuit 111 again, so that a changing point can be obtained.

In a case where the part of the light beam affected by the Fresnel diffraction scans the bar code, the amount of variation of the differential waveform signal output by the first differentiating circuit 111 is sufficiently large in comparison with in a case where the normal light beam scans the bar code. To reduce the amount of variation of the differential waveform signal in the case where the part of the light beam affected by the Fresnel diffraction scans the bar code, the hysteresis unit 113 is used.

In a case where the amplitude of the differential waveform signal from the first differentiating circuit 111 is small, the edge signals "WEG" and "BEG" are not generated due to the influence of the Fresnel diffraction. Thus, only when the amplitude of the differential waveform signal from the first differentiating circuit 111 is large, the hysteresis unit 113 is activated.

Referring to FIG. 23, a peak hold circuit 114 holds the peak level of the differential waveform signal from the first differentiating circuit 111 and discharges the held voltage in a time constant. A dividing circuit 115 divides the voltage held by the peak hold circuit 114. A comparing circuit 116 compares the divided voltage value and a fixed voltage. If the divided voltage value is greater than the fixed voltage, an analog switch 117 is turned on so that the hysteresis unit 113 is activated, as shown in FIG. 24. A switch formed of a transistor can be substituted for the analog switch 117.

Thus, in the bar-code reader as described above, the changing point generated due to the influence of the Fresnel diffraction is absorbed by the hysteresis unit 113, so that the true changing point can be detected.

Figure 25:
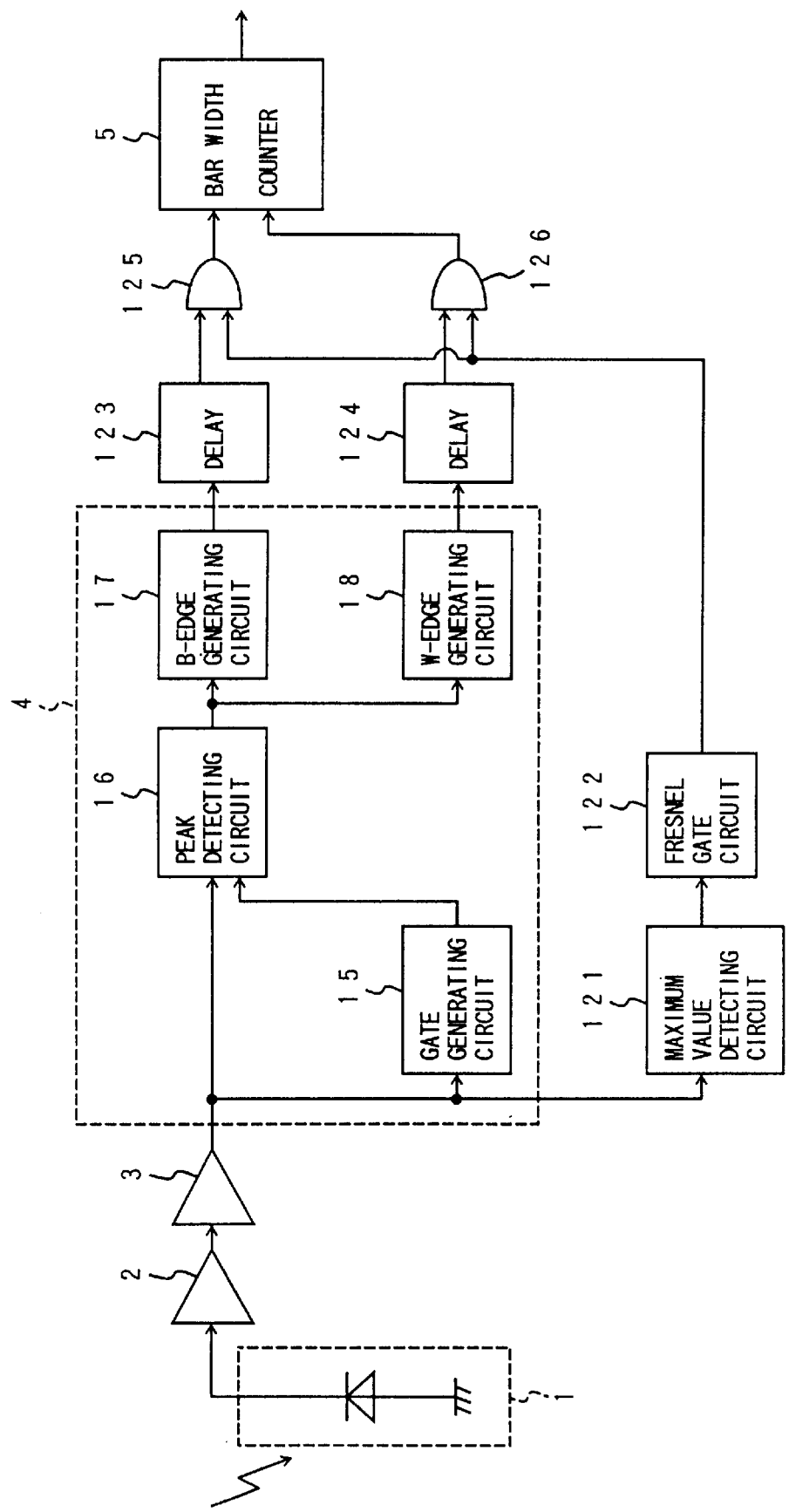
FIG. 25 is a block diagram illustrating the bar-code reader according to the sixth embodiment of the present invention.

FIG. 25 shows the bar-code reader according to a sixth embodiment of the present invention.

Referring to FIG. 25, the bar-code reader has the photoelectric conversion circuit 1, the AMP 2, the differentiating circuit 3, the peak detecting unit 4, a maximum value detecting circuit 121, a fresnel gate circuit 122, a first delay circuit 123, a second delay circuit 124, a first AND gate 125, a second AND gate and the bar width counter 5. In FIG. 25, those parts which are the same as those shown in FIGS. 2 and 7 are given the same reference numbers.

The peak detecting unit 4 has the peak detecting circuit 16, the gate generating circuit 15, the B-edge generating circuit 17 and the W-edge generating circuit 18 and detects plus and minus peak points of the differential waveform signal. The peak detecting circuit 16 detects the plus and minus peak points, corresponding to changing points of the bar code, of the differential waveform signal. The gate generating circuit 15 generates the gate signal supplied as the enable signal to the peak detecting circuit 16. The B-edge generating circuit 17 generates the edge signal "BEG" corresponding to the minus peak points detected by the peak detecting circuit 16. The W-edge generating circuit 18 generates the edge signal "WEG" corresponding to the plus peak points detected by the peak detecting circuit 16. When the gate generating circuit 15 outputs the gate signal having the value "1" in the enable state, the peak detecting circuit 16 carried out the process for detecting peak points. The gate generating circuit 15 monitors the differential waveform signal generated by the differentiating circuit 3. When the level of the differential waveform signal exceeds the specific voltage level, the gate generating circuit 15 outputs the gate signal having the value of "1" to the peak detecting circuit 16. The specific voltage level is set as a value so that changing points can be detected from the differential waveform signal. The differential waveform signal generated by the differentiating circuit 3 has plus peak points corresponding to changing point sat each of which the scanning point is moved from a black stripe to a white stripe in the bar code and minus peak points corresponding to changing points at each of which the scanning point is moved from a white stripe to a black stripe in the bar code.

In a case where a plurality of changing points are detected when the gate signal generated by the gate generating circuit 16 has the value of "1", the maximum value detecting circuit 121 detects the maximum value of the peak point of the differential waveform signal.

The fresnel gate circuit 122 generating a signal is used to mask changing points generated due to the Fresnel diffraction before the changing point is detected by the maximum value detecting circuit 121.

The first delay circuit 123 and the second delay circuit 124 respectively delay the edge signals generated by the B-edge generating circuit 17 and the W-edge generating circuit 18.

The first AND gate 125 and the second AND gate 126 respectively output the gate signals generated by the B-edge generating circuit 17 and the W-edge generating circuit 18 when the fresnel gate circuit 122 does not mask the edge signals.

In the bar-code reader as shown in FIG. 25, a changing point detected first after the mask generated by the fresnel gate circuit 122 is removed is decided as the true changing point.

Figure 26:
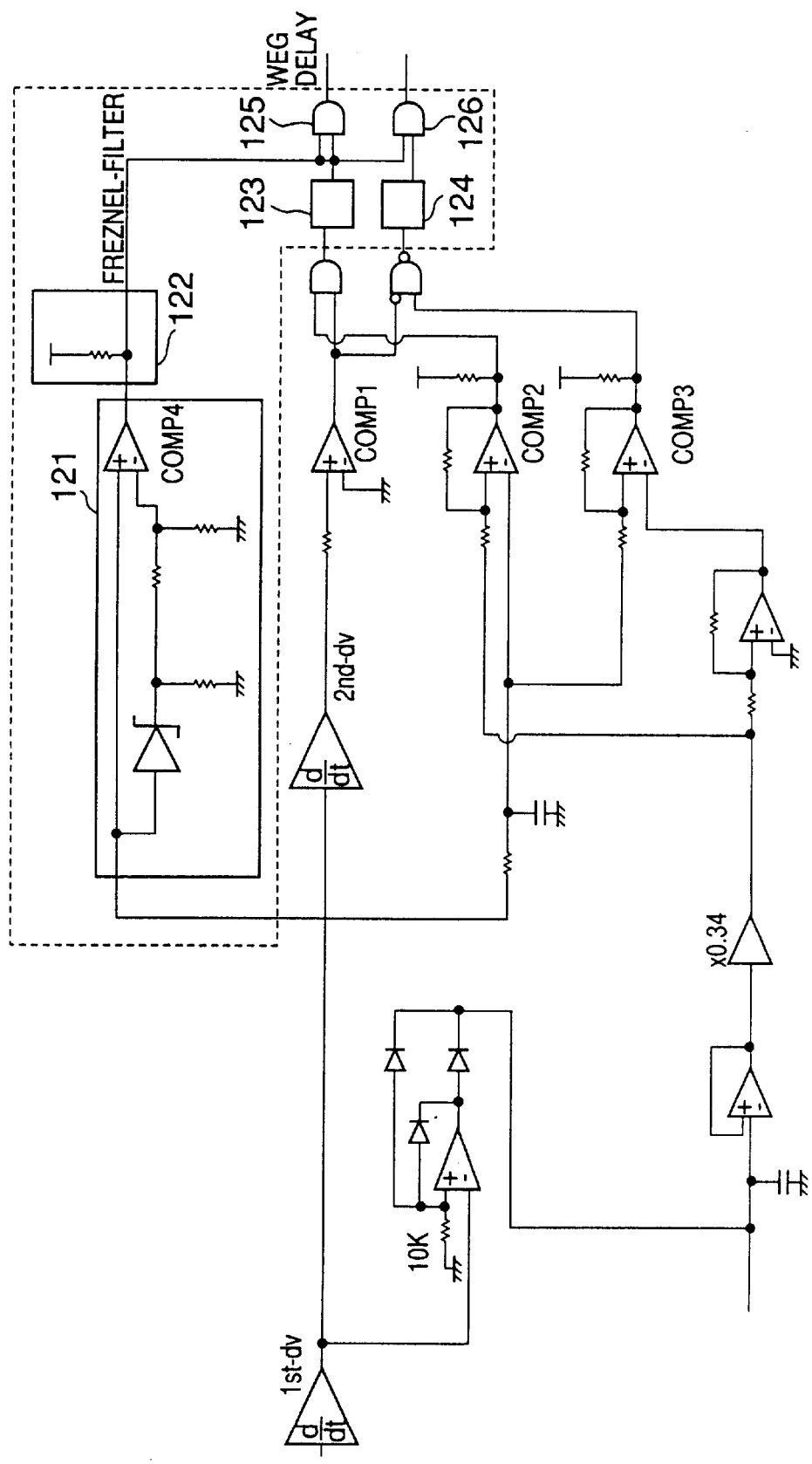
FIG. 26 is a circuit diagram illustrating a maximum value detecting circuit of the bar-code reader shown in FIG. 25.

A description will now be given, with reference to FIGS. 26 and 27, of a process for determining whether a changing point is the false changing point generated due to the influence of the Fresnel diffraction or the true changing point. In FIG. 26, portions other than a portion surrounded by a dashed line are the same as in a conventional circuit.

Figure 27:
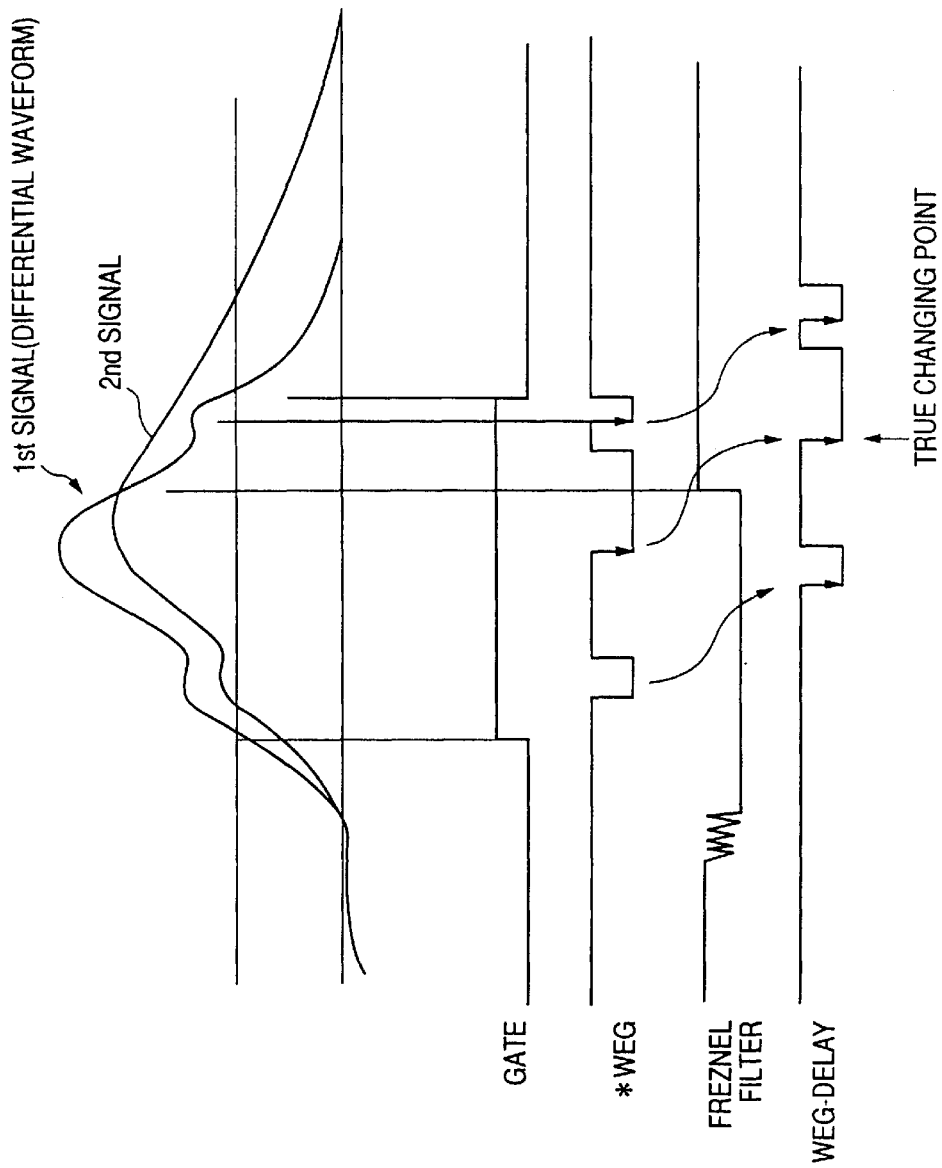
FIG. 27 is a waveform diagram illustrating an operation of the bar-code reader according to the sixth embodiment of the present invention.

Referring to FIG. 26, in the maximum value detecting circuit 121 which is a circuit surrounded by the dashed line, a first signal (see FIG. 27) having the differential waveform input thereto and a second signal (see FIG. 27) generated by dividing the first signal by a diode are compared with each other, and a Fresnel Filter signal as shown in FIG. 27 is generated. The circuit surrounded by the dashed line uses a peak-hold circuit and detects peak points of the differential waveform signal. Since a changing point corresponding to the edge signal generated before the peak point is detected can be regarded as the false changing point, the fresnel gate circuit 122 generates the Fresnel Filter signal which controls the AND gates 125 and 126 so that the AND gates 125 and 126 are opened after the peak point is detected. Since the peak point corresponds to a position at which the true changing point is generated, the edge signals "WEG" and "BEG" are delayed by the first and second delay circuit 123 and 124 and the delayed signals and the gate signal (Fresnel Filter signal) are applied to the AND operations.

Thus, in the bar-code reader according to this embodiment of the present invention, after the mask signal (the Fresnel Filter signal) generated by the fresnel gate circuit 122 is removed, changing point generated first is decided as the true changing point.

The present invention is not limited to the aforementioned embodiments, and other variations and modifications may be made without departing from the scope of the claimed invention.

What is claimed is:

1. A bar code reader comprising:

photoelectric conversion means for converting reflected light from a bar code into an electric signal;

differentiating means for differentiating said electric signal so as to generate a differential waveform signal;

changing point detecting means for detecting from the differential waveform signal, a changing point at which a white stripe is changed to a black stripe in the bar code or a black stripe is changed to a white stripe in the bar code; and determination means for determining whether the detected changing point is a true changing point or a false changing point, based on measurement of a distance between changing points, said determination means selecting, as a true changing point, one of a plurality of detected changing points detected by the changing point detecting means.

2. The bar-code reader a claimed in claim 1, wherein said determination means comprises:

gate signal generating means for generating a gate signal indication that a white stripe or black stripe is changed to a black or white stripe in the bar code when the electric signal exceeds a predetermined threshold; and center determination means for, when the gate signal by said gate signal generating means indicates that a white or black stripe is changed to a black or white stripe, determining a changing point closest to the center of the gate signal from a plurality of changing points detected by said changing point detecting means as the true changing point.

3. A bar-code reader as claimed in claim 1, wherein said determination means comprises:

gate signal generating means for generating a gate signal indicating that a white stripe or black is changed to a black stripe or white stripe in the bar code when the electric signal exceeds a predetermined threshold;

pulse signal generating means for generating a pulse signal indicating changing points at which a white or black stripe is changed to a black or white stripe in the bar code;

pulse width measuring means for measuring a pulse width of the pulse signal generated by said pulse signal generating means; and pulse width determination means for, when the gate signal generated by said gate signal generating means indicates that a white or black stripe is changed to a black or white stripe, determining a changing point corresponding to the pulse signal having the largest pulse width measured by said pulse width measuring means from a plurality of changing points detected by said changing point detecting means as the true changing point.

4. A bar-code reader comprising:

photoelectric conversion means for converting reflected light from a bar code into an electric signal;

a differentiating means for differentiating said electric signal so as to generate a differential waveform signal;

changing point detecting means for detecting, from the differential waveform signal, a changing point at which a white stripe is changed to a black stripe in the bar code or a black stripe is changed to a white stripe in the bar code; and determination means for determining whether the detected changing point is a true changing point or a false changing point, wherein said determination means comprises:

gate signal generating means for generating a gate signal indicating that a white stripe or black stripe is changed to a black stripe or white stripe in the bar code when the electric signal exceeds a predetermined threshold;

pulse signal generating means for generating a pulse signal indicating changing points at which a white or black stripe is changed to a black or white stripe in the bar code;

pulse signal count means for counting the pulse signal; and integer determination means for, when the gate signal indicates that a white or black stripe is changed to a black or white stripe, determining a changing point corresponding to a center of the pulse signal as the true changing point when a number of detected changing points is odd and determining a changing point detected first as the true changing point when a number of detected changing points is even.

5. A bar-code reader, comprising:

photoelectric conversion means for converting reflected light form a bar code into an electric signal;

a differentiating means for differentiating said electric signal so as to generate a differential waveform signal; and changing point detecting means for detecting, from the differential waveform signal, a changing point at which a white stripe is changed to a black stripe in the bar code or a black stripe is changed to a white stripe in the bar code; and determination means for determining whether the detected changing point is a true changing point or a false changing point, wherein said determination means comprises:

gate signal generating means for generating a gate signal indicating that a white stripe or black stripe is changed to a black stripe or white stripe in the bar code when the electric signal exceeds a predetermined threshold;

maximum differential waveform signal peak detecting means for detecting a changing point having a maximum differential waveform signal peak value from a plurality of detected changing points when the gate signal indicates that a white or black stripe is changed to a black or white stripe; and maximum differential waveform signal peak determination means for determining the changing point detected by said maximum differential waveform signal peak detecting means as the true changing point.

6. A bar-code reader, comprising:

photoelectric conversion means for converting reflected light from a bar code into an electric signal;

a differentiating means for differentiating said electric signal so as to generate a differential waveform signal;

changing point detecting means for detecting, from the differential waveform signal, a changing point at which a white stripe is changed to a black stripe in the bar code or a black stripe is changed to a white stripe in the bar code; and determination means for determining whether the detected changing point is a true changing point or a false changing point wherein said determination means comprises:

gate signal generating means for generating a gate signal indicating that a white stripe or a black stripe is changed to a black stripe or white stripe in the bar code when the electric signal exceeds a predetermined threshold;

pulse signal generating means for generating a pulse signal indicating changing points which a white stripe or black stripe is changed to a black stripe or white stripe in the bar code;

pulse signal count means for counting the changing points indicated by the pulse signal generated by said pulse signal generating means when the gate signal indicates the white-to-black change or the black-to-white change in the bar code; and integer determination means for determining a changing point corresponding to a center of the pulse signals the true changing point when the counted number of the changing points is odd.

7. A bar-code reader, comprising:

photoelectric conversion means for converting reflected light from a bar code into an electric signal;

differentiating means for differentiating said electric signal so as to generate a differential waveform signal;

changing point detecting means for detecting, form the differential waveform signal, a changing point at which a white stripe is changed to a black stripe in the bar code or a black stripe is changed to a white stripe in the bar code; and determination means for determining whether the detected changing pint is a true changing point or a false changing point wherein said determination means comprises:

gate signal generating means for generating a gate signal indicating that a white stripe or black stripe is changed to a black stripe or white stripe on the bar code when the electric signal exceeds a predetermined threshold;

pulse signal generating means for generating a pulse signal indicating changing points at which a white stripe or a black stripe is changed to a black stripe or white stripe in the bar code;

pulse signal count means for counting the changing points indicated by the pulse signal generated by said pulse signal generating means when the gate signal indicates the white-to-black change or the black-to-white change in the bar code; and integer determination means for determining a first detected one of the changing points as the true changing point when the counted number of the changing points is even.

8. A bar code reader comprising:

photoelectric conversion means for converting reflected light from a bar code into an electric signal;

differentiating means for differentiating said electric signal so as to generate a differential waveform signal indicating a first derivative of said electric signal;

changing point detecting means for detecting a changing point at which a white stripe is changed to a black stripe in the bar code or a black stripe is changed to a white stripe in the bar code which is determined from peaks of the differential waveform signal;

counting means for counting the number of successive changing points having a same polarity detected by the changing point detecting means; and determination means for determining a changing point in a center of the successive changing points as a true changing point when the counted number of the successive changing points is odd.

9. A bar code reader comprising:

photoelectric conversion means for converting reflected light from a bar code into an electric signal;

differentiating means for differentiating said electric signal so as to generate a differential waveform signal indicating a first derivative of said electric signal;

changing point detecting means for detecting a changing point at which a white stripe is changed to a black stripe in the bar code or a black stripe is changed to a white stripe in the bar code which is determined from peaks of the differential waveform signal;

counting means for counting the number of successive changing points having a same polarity detected by the changing point detecting means; and determination means for determining a first detected changing point as a true changing point when the counted number of the successive changing points is even.

10. A bar code reader comprising:

photoelectric conversion means for converting reflected light from a bar code into an electric signal;

differentiating means for differentiating said electric signal so as to generate a differential waveform signal indicating a first derivative of said electric signal;

changing point detecting means for detecting a changing point at which a white stripe is changed to a black stripe in the bar code or a black stripe is changed to a white stripe in the bar code which is determined from peaks of the differential waveform signal;

counting means for counting a number of successive changing points having a same polarity detected by the changing point detecting means; and integer determination means for determining a changing point corresponding to a center of the number of successive changing points as a true changing pint when the counted number of the successive changing point sis odd, and for determining a first detected changing point as the true changing point when the counted number of the successive changing points is even.

11. A bar code reader comprising:

photoelectric conversion means for converting reflected light from a bar code into an electric signal;

differentiating means for differentiating said electric signal so as to generate a differential waveform signal indicating a first derivative of said electric signal;

changing point detecting means for detecting a changing point at which a white stripe is changed to a black stripe in the bar code or a black stripe is changed to a white stripe in the bar code which is determined from peaks of the differential waveform signal;

maximum differential waveform signal peak detecting means for detecting a changing point having a maximum differential waveform signal peak value from a plurality of successive changing points having a same polarity detected by said changing point detecting means; and maximum differential signal peak determination means of redetermining the changing point detected by said maximum differential waveform signal peak detecting means as a true changing point.

* * * * *